United States Patent
Proctor, Jr. et al.

(10) Patent No.: US 8,774,079 B2
(45) Date of Patent: Jul. 8, 2014

(54) REPEATER TECHNIQUES FOR MULTIPLE INPUT MULTIPLE OUTPUT UTILIZING BEAM FORMERS

(75) Inventors: James Arthur Proctor, Jr., Melbourne Beach, FL (US); James C. Otto, West Melbourne, FL (US); Kenneth Marvin Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 12/439,018

(22) PCT Filed: Oct. 26, 2007

(86) PCT No.: PCT/US2007/022743
§ 371 (c)(1),
(2), (4) Date: Jul. 2, 2009

(87) PCT Pub. No.: WO2008/057290
PCT Pub. Date: May 15, 2008

(65) Prior Publication Data
US 2009/0323582 A1 Dec. 31, 2009

Related U.S. Application Data

(60) Provisional application No. 60/854,424, filed on Oct. 26, 2006.

(51) Int. Cl.
*H04B 7/14* (2006.01)
*H04B 3/36* (2006.01)

(52) U.S. Cl.
USPC .............................................. 370/315; 455/7

(58) Field of Classification Search
None
See application file for complete search history.

(56) References Cited

U.S. PATENT DOCUMENTS 3,363,250 A 1/1968 Jacobson
4,000,467 A 12/1976 Lentz et al.
(Continued)

FOREIGN PATENT DOCUMENTS

CA 2051283 A1 3/1992
CN 1137335 A 12/1996
(Continued)

OTHER PUBLICATIONS

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

(Continued)

*Primary Examiner* — John Blanton
(74) *Attorney, Agent, or Firm* — Thien T. Nguyen

(57) ABSTRACT

A repeater for a wireless communication network includes a first reception antenna for receiving a reception signal on a first path from one of an access point, another repeater or a wireless station device; a second reception antenna for receiving the reception signal on a second path; a reception weighting circuit for applying first and second weights to the reception signal to generate a first weighted reception signal and a second weighted reception signal; a signal combiner for combining the first and second weighted reception signals according to various mathematical combinations to generate a plurality of combined reception signals; and a transmission antenna for transmitting a transmission signal corresponding to one of the combined reception signals to one of the access point, the another repeater or the wireless station device.

30 Claims, 42 Drawing Sheets

(56) References Cited

U.S. PATENT DOCUMENTS

| | | |
|---|---|---|
| 4,001,691 A | 1/1977 | Gruenberg et al. |
| 4,061,970 A | 12/1977 | Magneron et al. |
| 4,081,752 A | 3/1978 | Sumi et al. |
| 4,124,825 A | 11/1978 | Webb et al. |
| 4,204,016 A | 5/1980 | Chavannes et al. |
| 4,334,323 A | 6/1982 | Moore et al. |
| 4,368,541 A | 1/1983 | Evans et al. |
| 4,509,206 A | 4/1985 | Carpe et al. |
| 4,679,243 A | 7/1987 | McGeehan et al. |
| 4,701,935 A | 10/1987 | Namiki et al. |
| 4,723,302 A | 2/1988 | Fulmer et al. |
| 4,777,653 A | 10/1988 | Bonnerot et al. |
| 4,783,843 A | 11/1988 | Leff et al. |
| 4,820,568 A | 4/1989 | Harpell et al. |
| 4,922,259 A | 5/1990 | Hall et al. |
| 5,023,930 A | 6/1991 | Leslie et al. |
| 5,095,528 A | 3/1992 | Leslie et al. |
| 5,214,788 A | 5/1993 | Delaperriere et al. |
| 5,220,562 A | 6/1993 | Takada et al. |
| 5,280,480 A | 1/1994 | Pitt et al. |
| 5,333,175 A | 7/1994 | Ariyavisitakul et al. |
| 5,341,364 A | 8/1994 | Marra et al. |
| 5,349,463 A | 9/1994 | Hirohashi et al. |
| 5,368,897 A | 11/1994 | Kurihara et al. |
| 5,371,734 A | 12/1994 | Fischer et al. |
| 5,373,503 A | 12/1994 | Chen et al. |
| 5,383,144 A | 1/1995 | Kato |
| 5,408,197 A | 4/1995 | Miyake et al. |
| 5,408,618 A | 4/1995 | Aho et al. |
| 5,430,726 A | 7/1995 | Moorwood et al. |
| 5,446,770 A | 8/1995 | Urabe et al. |
| 5,465,251 A | 11/1995 | Judd et al. |
| 5,471,642 A | 11/1995 | Palmer et al. |
| 5,485,486 A | 1/1996 | Gilhousen et al. |
| 5,509,028 A | 4/1996 | Marque-Pucheu et al. |
| 5,515,376 A | 5/1996 | Murthy et al. |
| 5,519,619 A | 5/1996 | Seda et al. |
| 5,608,755 A | 3/1997 | Rakib et al. |
| 5,610,916 A | 3/1997 | Kostreski et al. |
| 5,648,984 A | 7/1997 | Kroninger et al. |
| 5,654,979 A | 8/1997 | Levin et al. |
| 5,659,879 A | 8/1997 | Dupuy et al. |
| 5,678,177 A | 10/1997 | Beasley et al. |
| 5,678,198 A | 10/1997 | Lemson et al. |
| 5,684,801 A | 11/1997 | Amitay et al. |
| 5,697,052 A | 12/1997 | Treatch et al. |
| 5,726,980 A | 3/1998 | Rickard et al. |
| 5,732,334 A | 3/1998 | Miyake et al. |
| 5,745,846 A | 4/1998 | Myer et al. |
| 5,754,540 A | 5/1998 | Liu et al. |
| 5,764,636 A | 6/1998 | Edsall et al. |
| 5,767,788 A | 6/1998 | Ness |
| 5,771,174 A | 6/1998 | Spinner et al. |
| 5,784,683 A | 7/1998 | Sistanizadeh et al. |
| 5,794,145 A | 8/1998 | Milam et al. |
| 5,812,933 A | 9/1998 | Niki et al. |
| 5,815,795 A | 9/1998 | Iwai et al. |
| 5,825,809 A | 10/1998 | Sim |
| 5,852,629 A | 12/1998 | Iwamatsu et al. |
| 5,857,144 A | 1/1999 | Mangum et al. |
| 5,862,207 A | 1/1999 | Aoshima et al. |
| 5,875,179 A | 2/1999 | Tikalsky et al. |
| 5,883,884 A | 3/1999 | Atkinson et al. |
| 5,884,181 A | 3/1999 | Arnold et al. |
| 5,890,055 A | 3/1999 | Chu et al. |
| 5,903,553 A | 5/1999 | Sakamoto et al. |
| 5,907,794 A | 5/1999 | Lehmusto et al. |
| 5,963,846 A | 10/1999 | Kurby et al. |
| 5,963,847 A | 10/1999 | Ito et al. |
| 5,987,304 A | 11/1999 | Latt et al. |
| 6,005,855 A | 12/1999 | Zehavi et al. |
| 6,005,884 A | 12/1999 | Cook et al. |
| 6,014,380 A | 1/2000 | Hendel et al. |
| 6,032,194 A | 2/2000 | Gai et al. |
| 6,061,548 A | 5/2000 | Reudink et al. |
| 6,088,570 A | 7/2000 | Komara et al. |
| 6,101,400 A | 8/2000 | Ogaz et al. |
| 6,108,364 A | 8/2000 | Weaver, Jr. et al. |
| 6,128,512 A | 10/2000 | Trompower et al. |
| 6,128,729 A | 10/2000 | Kimball et al. |
| 6,141,335 A | 10/2000 | Kuwahara et al. |
| 6,163,276 A | 12/2000 | Irving et al. |
| 6,188,694 B1 | 2/2001 | Fine et al. |
| 6,188,719 B1 | 2/2001 | Collomby et al. |
| 6,195,051 B1 | 2/2001 | McCoy et al. |
| 6,202,114 B1 | 3/2001 | Dutt et al. |
| 6,215,982 B1 | 4/2001 | Trompower et al. |
| 6,219,739 B1 | 4/2001 | Dutt et al. |
| 6,222,503 B1 | 4/2001 | Gietema et al. |
| 6,272,351 B1 | 8/2001 | Langston et al. |
| 6,285,863 B1 | 9/2001 | Zhang et al. |
| 6,298,061 B1 | 10/2001 | Chin et al. |
| 6,304,563 B1 | 10/2001 | Blessent et al. |
| 6,304,575 B1 | 10/2001 | Carroll et al. |
| 6,331,792 B1 | 12/2001 | Tonietto et al. |
| 6,339,694 B1 | 1/2002 | Komara et al. |
| 6,342,777 B1 | 1/2002 | Takahashi et al. |
| 6,363,068 B1 | 3/2002 | Kinoshita et al. |
| 6,370,185 B1 | 4/2002 | Schmutz et al. |
| 6,370,369 B1 | 4/2002 | Kraiem et al. |
| 6,377,612 B1 | 4/2002 | Baker et al. |
| 6,377,640 B2 | 4/2002 | Trans et al. |
| 6,384,765 B1 | 5/2002 | Sjostrand et al. |
| 6,385,181 B1 | 5/2002 | Tsutsui et al. |
| 6,388,995 B1 | 5/2002 | Gai et al. |
| 6,393,299 B1 | 5/2002 | Mizumoto et al. |
| 6,404,775 B1 | 6/2002 | Leslie et al. |
| 6,441,781 B1 | 8/2002 | Rog et al. |
| 6,473,131 B1 | 10/2002 | Neugebauer et al. |
| 6,480,481 B1 | 11/2002 | Park et al. |
| 6,498,804 B1 | 12/2002 | Ide et al. |
| 6,501,955 B1 | 12/2002 | Durrant et al. |
| 6,516,438 B1 | 2/2003 | Wilcoxson et al. |
| 6,535,732 B1 | 3/2003 | McIntosh et al. |
| 6,539,028 B1 | 3/2003 | Soh et al. |
| 6,539,204 B1 | 3/2003 | Marsh et al. |
| 6,549,542 B1 | 4/2003 | Dong et al. |
| 6,549,567 B1 | 4/2003 | Fullerton et al. |
| 6,563,468 B2 | 5/2003 | Hill et al. |
| 6,574,198 B1 | 6/2003 | Petersson et al. |
| 6,628,624 B1 | 9/2003 | Mahajan et al. |
| 6,664,932 B2 | 12/2003 | Sabet et al. |
| 6,671,502 B1 | 12/2003 | Ogawa et al. |
| 6,684,058 B1 | 1/2004 | Karacaoglu et al. |
| 6,690,657 B1 | 2/2004 | Lau et al. |
| 6,694,125 B2 | 2/2004 | White et al. |
| 6,718,160 B2 | 4/2004 | Schmutz et al. |
| 6,728,541 B2 | 4/2004 | Ohkura et al. |
| 6,766,113 B1 | 7/2004 | Al-Salameh et al. |
| 6,781,544 B2 | 8/2004 | Saliga et al. |
| 6,788,256 B2 | 9/2004 | Hollister |
| 6,880,103 B2 | 4/2005 | Kim et al. |
| 6,888,809 B1 | 5/2005 | Foschini et al. |
| 6,888,881 B1 | 5/2005 | Nagano |
| 6,904,266 B1 | 6/2005 | Jin et al. |
| 6,906,669 B2 | 6/2005 | Sabet et al. |
| 6,934,511 B1 | 8/2005 | Lovinggood et al. |
| 6,934,555 B2 | 8/2005 | Silva et al. |
| 6,944,139 B1 | 9/2005 | Campanella et al. |
| 6,957,042 B2 | 10/2005 | Williams et al. |
| 6,965,568 B1 | 11/2005 | Larsen |
| 6,983,162 B2 | 1/2006 | Garani et al. |
| 6,985,516 B1 | 1/2006 | Easton et al. |
| 6,990,313 B1 | 1/2006 | Yarkosky et al. |
| 7,027,418 B2 | 4/2006 | Gan et al. |
| 7,027,770 B2 | 4/2006 | Judd et al. |
| 7,043,203 B2 | 5/2006 | Miquel et al. |
| 7,050,442 B1 | 5/2006 | Proctor et al. |
| 7,050,452 B2 | 5/2006 | Sugar et al. |
| 7,058,071 B1 | 6/2006 | Myles et al. |
| 7,058,368 B2 | 6/2006 | Nicholls et al. |
| 7,065,036 B1 | 6/2006 | Ryan |
| 7,088,734 B2 | 8/2006 | Newberg et al. |
| 7,103,344 B2 | 9/2006 | Menard et al. |

(56) References Cited

U.S. PATENT DOCUMENTS

| | | |
|---|---|---|
| 7,120,930 B2 | 10/2006 | Maufer et al. |
| 7,123,670 B2 | 10/2006 | Gilbert et al. |
| 7,123,676 B2 | 10/2006 | Gebara et al. |
| 7,132,988 B2 | 11/2006 | Yegin et al. |
| 7,133,391 B2 | 11/2006 | Belcea et al. |
| 7,133,460 B2 | 11/2006 | Bae et al. |
| 7,139,527 B2 | 11/2006 | Tamaki et al. |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake et al. |
| 7,233,771 B2 | 6/2007 | Proctor, Jr. et al. |
| 7,248,645 B2 | 7/2007 | Vialle et al. |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim et al. |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim et al. |
| 7,457,587 B2 | 11/2008 | Chung |
| 7,463,200 B2 | 12/2008 | Gainey et al. |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 8,023,885 B2 | 9/2011 | Proctor, Jr. et al. |
| 8,027,642 B2 | 9/2011 | Proctor, Jr. et al. |
| 8,059,727 B2 | 11/2011 | Proctor, Jr. et al. |
| 8,111,645 B2 | 2/2012 | Proctor, Jr. et al. |
| 8,559,379 B2 | 10/2013 | Gainey et al. |
| 2001/0028638 A1 | 10/2001 | Walton et al. |
| 2001/0031646 A1 | 10/2001 | Williams et al. |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018479 A1 | 2/2002 | Kikkawa et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1 | 5/2002 | Sugar et al. |
| 2002/0072853 A1 | 6/2002 | Sullivan |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson et al. |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0146026 A1 | 10/2002 | Unitt et al. |
| 2002/0155838 A1 | 10/2002 | Durrant et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0008669 A1 | 1/2003 | Stein et al. |
| 2003/0026363 A1 | 2/2003 | Stoter et al. |
| 2003/0063583 A1 | 4/2003 | Padovani et al. |
| 2003/0124976 A1 | 7/2003 | Tamaki et al. |
| 2003/0139175 A1 | 7/2003 | Kim et al. |
| 2003/0148736 A1* | 8/2003 | Wright et al. .................. 455/66 |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0001464 A1 | 1/2004 | Adkins et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0056802 A1 | 3/2004 | Hollister |
| 2004/0110469 A1* | 6/2004 | Judd et al. .................. 455/15 |
| 2004/0121648 A1 | 6/2004 | Voros |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0240426 A1 | 12/2004 | Wu et al. |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1* | 2/2005 | Stephens et al. .................. 370/229 |
| 2005/0042999 A1 | 2/2005 | Rappaport et al. |
| 2005/0130587 A1 | 6/2005 | Suda et al. |
| 2005/0190822 A1 | 9/2005 | Fujii et al. |
| 2005/0201315 A1 | 9/2005 | Lakkis et al. |
| 2005/0254442 A1 | 11/2005 | Proctor, Jr. et al. |
| 2005/0256963 A1 | 11/2005 | Proctor, Jr. et al. |
| 2005/0286448 A1 | 12/2005 | Proctor et al. |
| 2006/0028388 A1 | 2/2006 | Schantz |
| 2006/0035643 A1 | 2/2006 | Vook et al. |
| 2006/0040615 A1 | 2/2006 | Mohamadi |
| 2006/0041680 A1 | 2/2006 | Proctor, Jr. et al. |
| 2006/0045193 A1 | 3/2006 | Stolpman et al. |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0067277 A1 | 3/2006 | Thomas et al. |
| 2006/0072682 A1* | 4/2006 | Kent et al. .................. 375/267 |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0237181 A1 | 10/2007 | Cho et al. |
| 2007/0268846 A1 | 11/2007 | Proctor, Jr. et al. |
| 2007/0286110 A1 | 12/2007 | Proctor, Jr. et al. |
| 2008/0057862 A1 | 3/2008 | Smith et al. |
| 2008/0232438 A1* | 9/2008 | Dai et al. .................. 375/148 |
| 2008/0233942 A9 | 9/2008 | Kim et al. |
| 2008/0267156 A1* | 10/2008 | Gubeskys et al. .................. 370/342 |
| 2009/0135745 A1 | 5/2009 | Gainey et al. |
| 2009/0190684 A1* | 7/2009 | She et al. .................. 375/267 |
| 2009/0290526 A1 | 11/2009 | Gainey et al. |
| 2010/0002620 A1 | 1/2010 | Proctor, Jr. et al. |

FOREIGN PATENT DOCUMENTS

| | | |
|---|---|---|
| CN | 1186401 A | 7/1998 |
| CN | 1256032 A | 6/2000 |
| CN | 1663149 | 8/2005 |
| CN | 1706117 A | 12/2005 |
| EP | 0523687 A2 | 1/1993 |
| EP | 0709973 A1 | 5/1996 |
| EP | 0715423 | 6/1996 |
| EP | 0847146 | 6/1998 |
| EP | 0853393 A1 | 7/1998 |
| EP | 0860953 A1 | 8/1998 |
| EP | 1538762 A2 | 6/2005 |
| EP | 1548526 A2 | 6/2005 |
| EP | 1615354 A2 | 1/2006 |
| GB | 2272599 A | 5/1994 |

(56) References Cited

FOREIGN PATENT DOCUMENTS

| | | |
|---|---|---|
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 06013947 | 1/1994 |
| JP | 06334577 | 12/1994 |
| JP | 07030473 | 1/1995 |
| JP | 7079187 A | 3/1995 |
| JP | 07079205 | 3/1995 |
| JP | 07131401 | 5/1995 |
| JP | 8097762 A | 4/1996 |
| JP | 8274683 A | 10/1996 |
| JP | 08274706 | 10/1996 |
| JP | 09018484 A | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 10242932 A | 9/1998 |
| JP | H10304437 A | 11/1998 |
| JP | 11055713 | 2/1999 |
| JP | 11127104 | 5/1999 |
| JP | 11298421 | 10/1999 |
| JP | 2000013248 A | 1/2000 |
| JP | 2000031877 | 1/2000 |
| JP | 2000502218 T | 2/2000 |
| JP | 2000082983 A | 3/2000 |
| JP | 2000509536 A | 7/2000 |
| JP | 2000236290 | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2001357480 A | 12/2001 |
| JP | 2002033691 | 1/2002 |
| JP | 2002111571 A | 4/2002 |
| JP | 2002223188 A | 8/2002 |
| JP | 2002271255 | 9/2002 |
| JP | 2002281042 A | 9/2002 |
| JP | 2003174394 | 6/2003 |
| JP | 2003198442 | 7/2003 |
| JP | 2003244050 | 8/2003 |
| JP | 2003250174 A | 9/2003 |
| JP | 2004056210 | 2/2004 |
| JP | 2004328666 | 11/2004 |
| JP | 2004538682 T | 12/2004 |
| JP | 2005072646 | 3/2005 |
| JP | 2005110150 | 4/2005 |
| JP | 2005191691 A | 7/2005 |
| JP | 2005236626 | 9/2005 |
| JP | 2005252692 A | 9/2005 |
| JP | 2005295499 A | 10/2005 |
| JP | 2005531202 | 10/2005 |
| JP | 2005531265 | 10/2005 |
| JP | 2006503481 | 1/2006 |
| JP | 2006505146 | 2/2006 |
| JP | 2006197488 A | 7/2006 |
| JP | 2007528147 A | 10/2007 |
| KR | 19980063664 | 10/1998 |
| KR | 1020040004261 A | 1/2004 |
| KR | 100610929 | 8/2006 |
| RU | 2120702 C1 | 10/1998 |
| RU | 2233045 C2 | 7/2004 |
| RU | 2264036 | 10/2004 |
| RU | 2242086 C2 | 12/2004 |
| RU | 2249916 C2 | 4/2005 |
| WO | WO9214339 | 8/1992 |
| WO | WO-9222145 A1 | 12/1992 |
| WO | 9505037 A1 | 2/1995 |
| WO | WO9622636 A1 | 7/1996 |
| WO | WO9715991 | 5/1997 |
| WO | WO9734434 | 9/1997 |
| WO | WO9852365 | 11/1998 |
| WO | WO9858461 | 12/1998 |
| WO | WO9923844 | 5/1999 |
| WO | WO9959264 | 11/1999 |
| WO | WO0050971 A2 | 8/2000 |
| WO | WO0152447 | 7/2001 |
| WO | WO0176098 A2 | 10/2001 |
| WO | WO0182512 | 11/2001 |
| WO | WO0199308 | 12/2001 |
| WO | WO0208857 A2 | 1/2002 |
| WO | WO0217572 A2 | 2/2002 |
| WO | WO03013005 | 2/2003 |
| WO | WO04001892 | 12/2003 |
| WO | WO04001986 A2 | 12/2003 |
| WO | WO04002014 A1 | 12/2003 |
| WO | WO2004004365 | 1/2004 |
| WO | WO2004032362 | 4/2004 |
| WO | WO2004036789 | 4/2004 |
| WO | WO2004038958 | 5/2004 |
| WO | WO2004047308 | 6/2004 |
| WO | WO2004062305 A1 | 7/2004 |
| WO | WO2004107693 A1 | 12/2004 |
| WO | WO2005050918 A2 | 6/2005 |
| WO | WO2005069249 A1 | 7/2005 |
| WO | WO2005069656 A1 | 7/2005 |
| WO | WO2005115022 | 12/2005 |

OTHER PUBLICATIONS

Code of Federal Regulations, Title 47 Telecommunication; "Federal Communications Commission code part 15.407," Federal Communications Commission vol. 1, chapter I, part 15.407.

First Office Action issued from the Chinese Patent Office in connection with corresponding Chinese application No. 200380101286.2.

Draft Corrigendum to IEEE Standard for Local and Metropolitan Area Networks—Part 16: Air Interface for Fixed Broadband Wireless Access Systems, IEEE P802.16-2004/Cor1/D5.

Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands.

First Report issued by IP Australia on Jul. 31, 2007 in connection with the corresponding Australian application No. 2003239577.

IEEE 802.16(e), Part 16: Air Interface for Fixed Broadband Wireless Access Systems, 2005, Sections 8.4.10.2.1; 8.4.10.3.2.

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11. 1999 Edition, Approved Sep. 16, 1999.

IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by The Institute of Electrical and Electronics Engineers, Inc., Jun. 27, 2003.

IEEE Std 802.16/2001; "Part 16: Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

(56) References Cited

OTHER PUBLICATIONS

Kutlu, at al., "Performance Analysis of MAC Protocols for Wireless Control Area Network," 1996 IEEE, pp. 494-499.

Mexican Office communication dated Jul. 2, 2007 issued from Mexican Patent Office for application PA/a/2004/011588 with partial translation thereof.

Notification of the First Office Action from Chinese Patent Office dates Sep. 8, 2006 for the corresponding Chinese patent application No. 200380105267.7.

Office Action issued from the Mexican Patent Office dated Feb. 22, 2008 in connection with the corresponding Mexican Patent Application No. PA/a/2004/011588.

Office communication dated Jan. 12, 2007 issued from the European Patent Office for counterpart application No. 03734139.9-1246.

Office communication dated Oct. 19, 2006 issued from the Mexican Patent Office for counterpart application No. PA/a/2004/011588.

Official communication issued from the European Patent Office dated Aug. 7, 2007 for the corresponding European patent application No. 03759271.4-2412.

Official communication issued from the European Patent Office dated Dec. 19, 2006 for the corresponding European patent application No. 03759271.4-2412.

Second Office Action issued from the Chinese Patent Office on Jul. 20, 2007 in connection with corresponding Chinese application No. 200380101286.2.

Specifications for 2.3 GHz Band Portable Internet Service—Physical & Medium Access Control Layer, TTAS.KO-06.0082/R1, Dec. 2005.

Third Office Action issued from the Patent Office of People's Republic of China dated Jan. 4, 2008 in corresponding Chinese Patent Application No. 200380101286.2.

Translation of Office Action issued by Chinese Patent Office on Oct. 19, 2007 in connection with the corresponding Chinese application No. 03814391.7.

U.S. PTO Office Action mailed on Apr. 17, 2007 for the corresponding parent U.S. Appl. No. 11/339,838, now U.S. Patent No. 7,230,935.

U.S. PTO Office Action mailed on Jan. 24, 2007 for the corresponding parent U.S. Appl. No. 11/339,838, now U.S. Patent No. 7,230,935.

U.S. PTO Office Action mailed on Nov. 21, 2006 for the corresponding parent U.S. Appl. No. 11/339,838, now U.S. Patent No. 7,230,935.

U.S PTO Office Action mailed on Nov. 6, 2006 for the corresponding parent U.S. Appl. No. 11/339,838, now U.S. Patent No. 7,230,935.

Dohler, M. et al., "Distributed PHY-Layer Mesh Networks," 14th IEEE 2003 International Symposium on Personal, Indoor and Mobile Radio Communication Proceedings, 2003. PIMRC 2003. The United States of America, IEEE, vol. 3, pp. 2543 to 2547, Sep. 7, 2003, doi: 10.1109/PIMRC.2003.1259184.

Fujii, T. et al., "Ad-hoc Cognitive Radio Cooperated with MAC Layer," IEIC Technical Report (Institute of Electronics, Information and Communication Engineers), Japan, Institute of Electronics, Information and Communication Engineers (IEIC), May 4, 2005, vol. 105 (36), pp. 59 to 66.

IEEE Computer Society and the IEEE Microwave Theory and Techniques Society: "Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands," IEEE P802.16e/D12, New York, USA, Oct. 14, 2005.

International Search Report and Written Opinion—PCT/US07/022743—ISA/EPO—Mar. 17, 2008.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Zimmermann, E. et al., "On the Performance of Cooperative Diversity Protocols in Practical Wireless Systems," IEEE 58th Vehicular Technology Conference, 2003, The United States of America, IEEE, Oct. 6, 2003, vol. 4, pp. 2212 to 2216.

Supplementary European Search Report—EP07839809, Search Authority—Munich Patent Office, Apr. 11, 2013.

\* cited by examiner

FIG. 4

DAC ENOB Requirement

| | Today | Proposed | Alternative | |
|---|---|---|---|---|
| Pout | | 20 | 20 | dBm |
| DAC ENOB | 12 | 12 | 11 | |
| DAC BackOff (Headroom) | | 12 | 12 | dB |
| Total DAC Noise (Tx) | | 60 | 54 | dBc |
| Total DAC Noise (Tx) | | -40 | -34 | dBm |
| Ant Iso | 35 | 35 | 35 | dB |
| Minimum Adaptive Isolation Required | | 7 | 13 | dB |
| Total DAC Noise (Rx, full 240 MSPS BW) | | -82 | -82 | dBm |
| DAC Noise Reduction in Rx Band Only (20MHz) | | 10.8 | 10.8 | dBm |
| Total DAC Noise (Rx, RX BW Only) | | -92.8 | -92.8 | dBm |
| Thermal Noise Floor | -93 | | | dBm |
| * assumes no reconstruction filter rejection (adj channels) | | | | |
| Difference Relative to Thermal Noise Level | | 0.2 | 0.2 | dB |

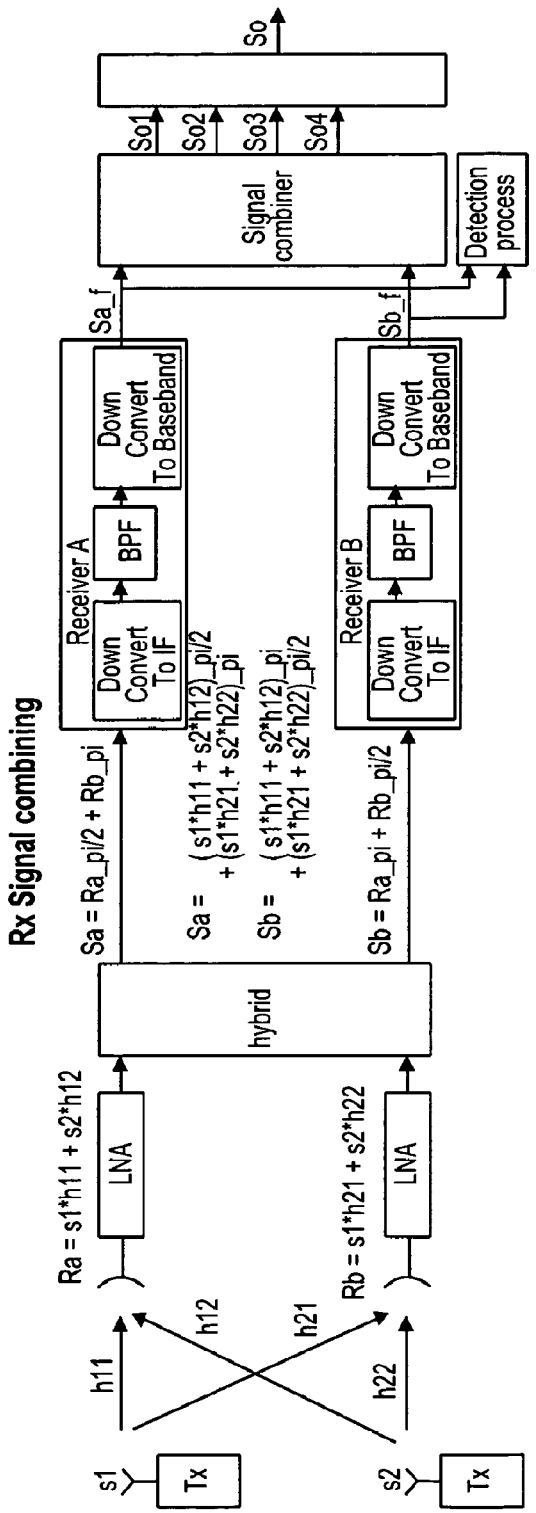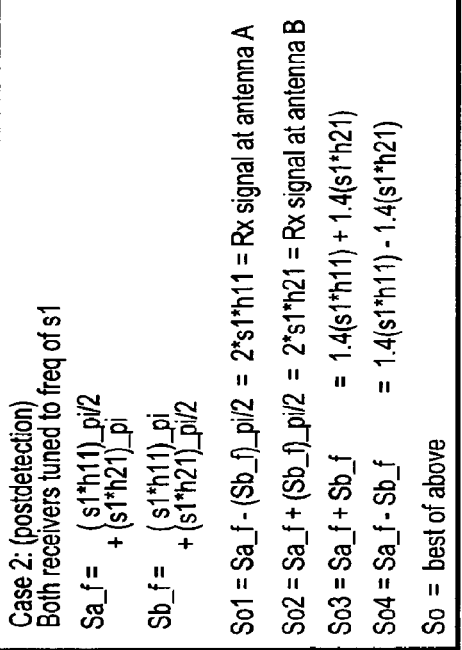
FIG. 19

LO Synthesizer RELATED ART

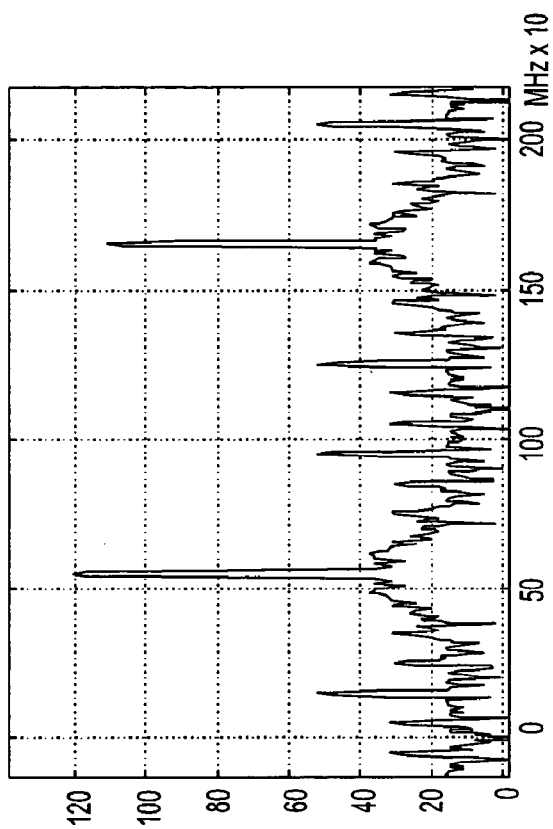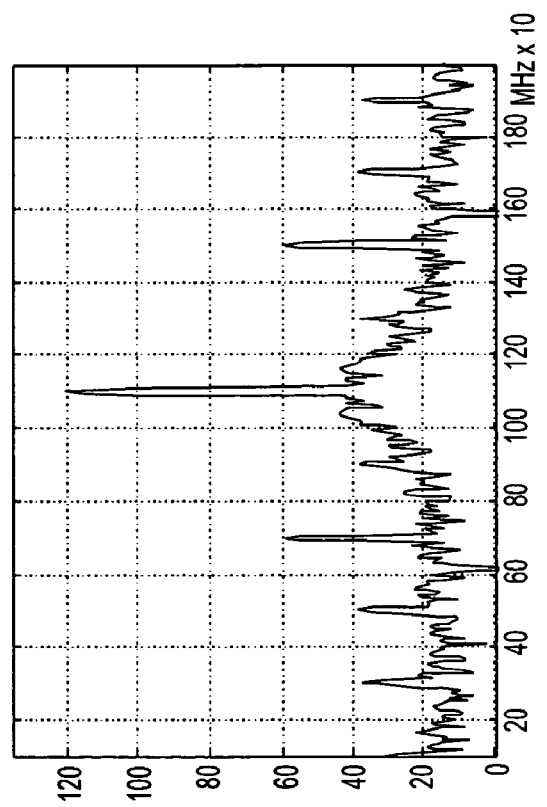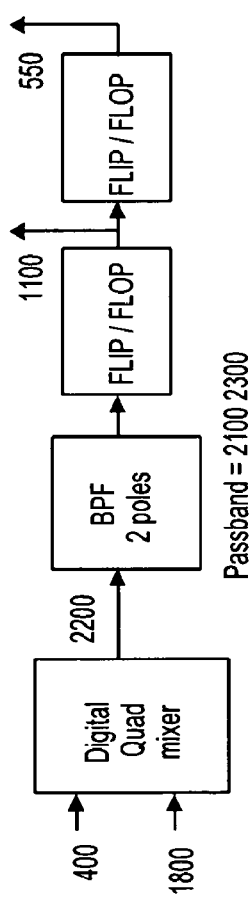
FIG. 30

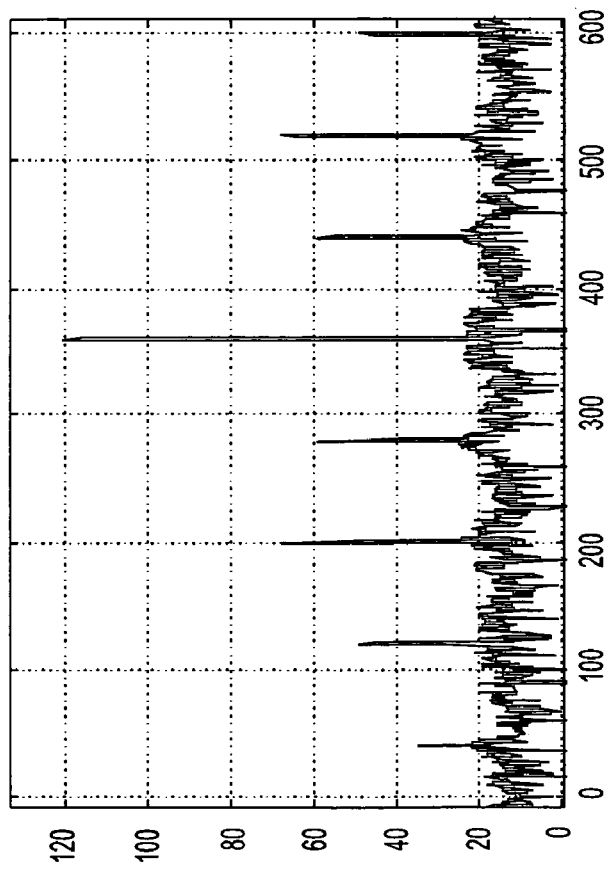
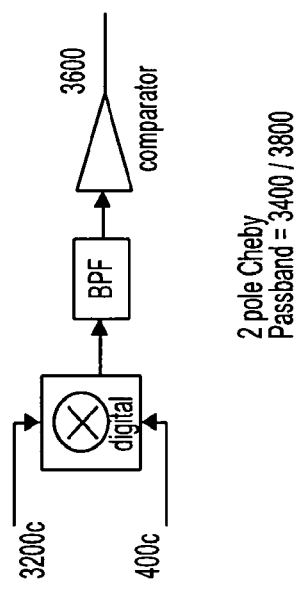
FIG. 31

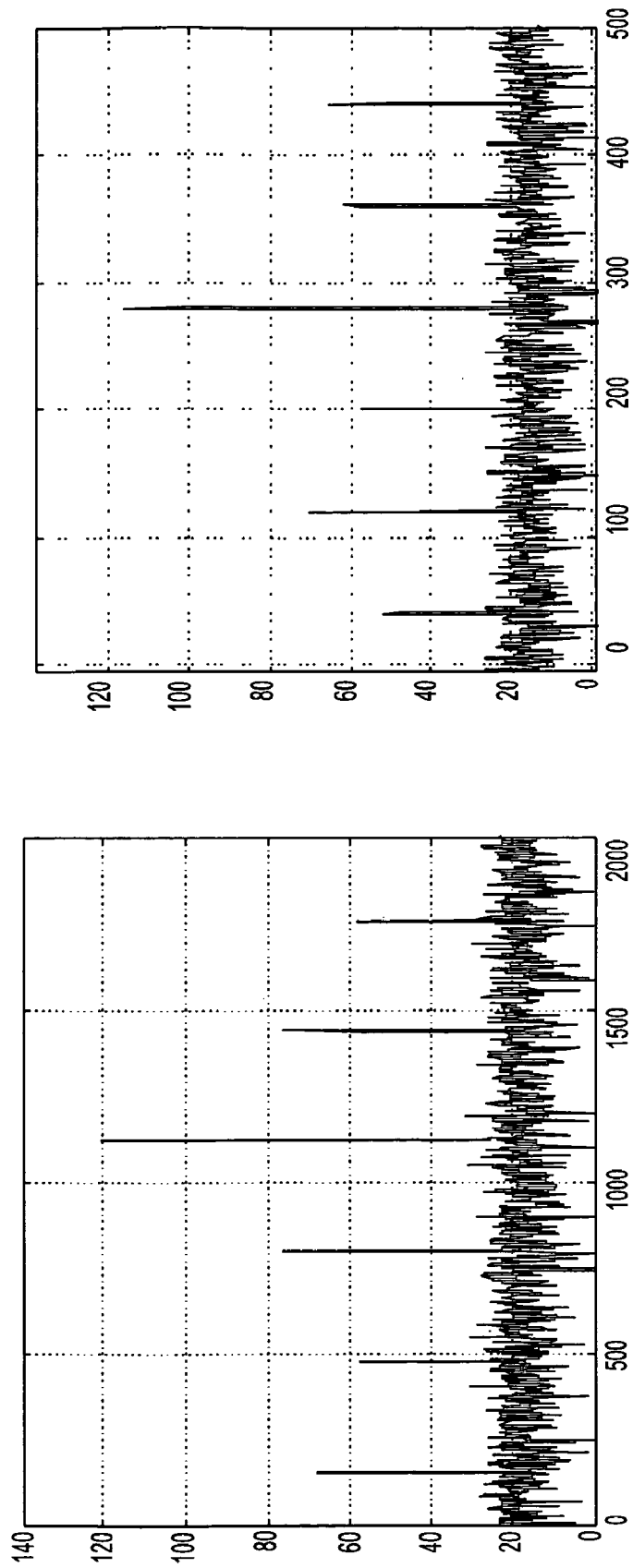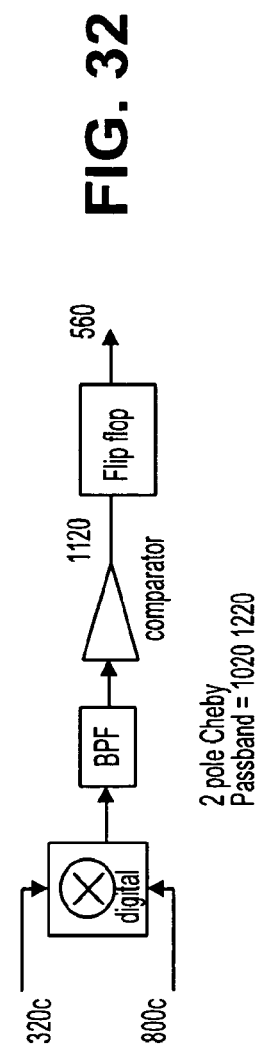
FIG. 32

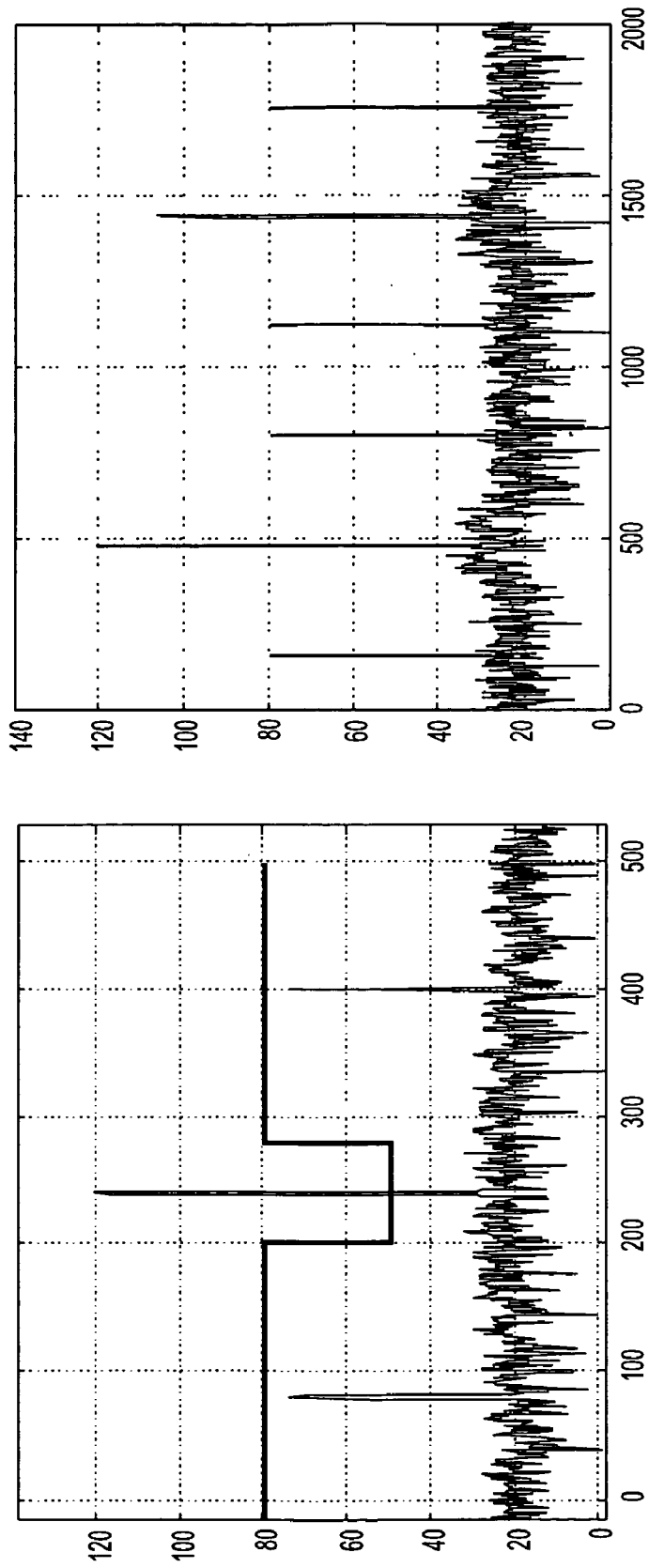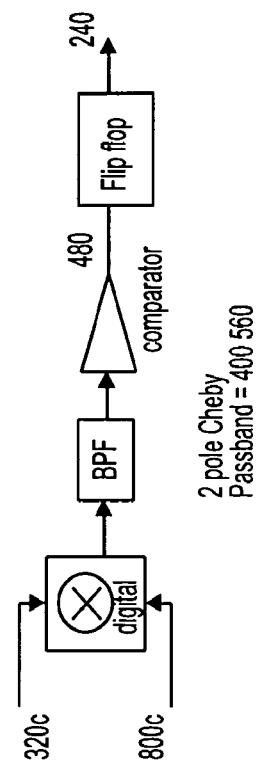
FIG. 33

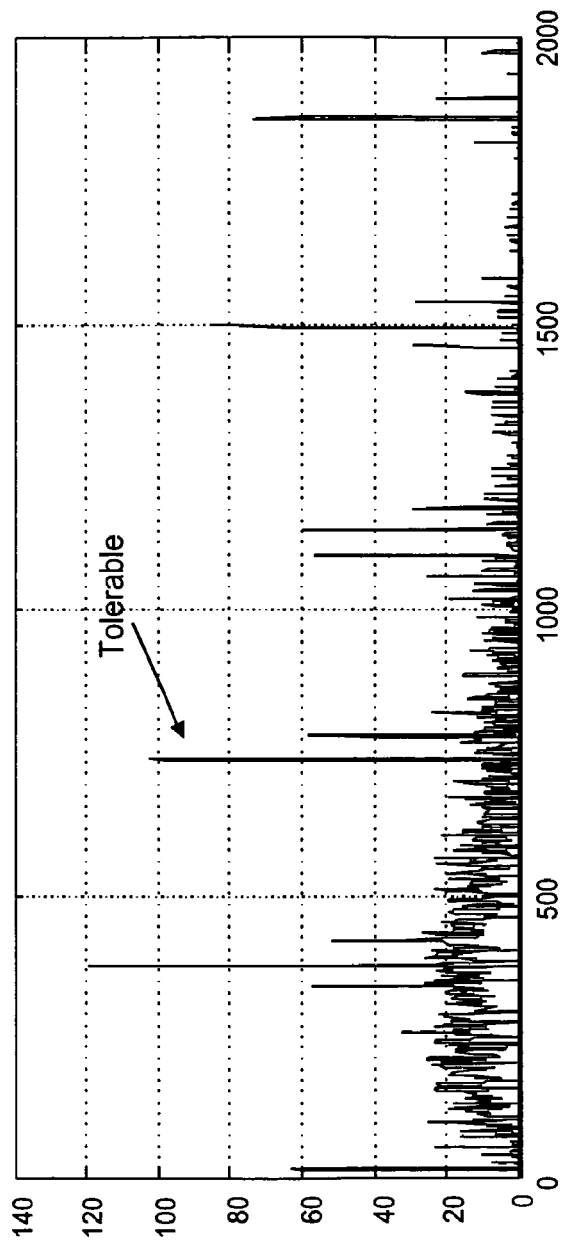
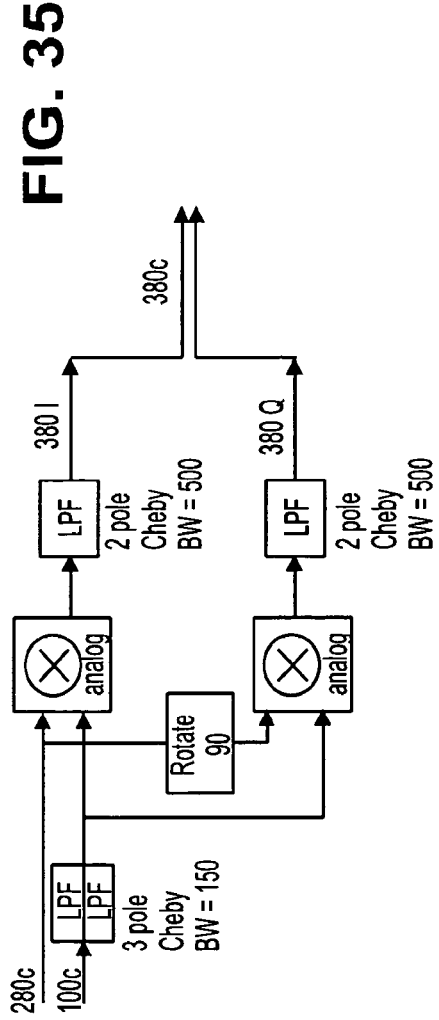
FIG. 35

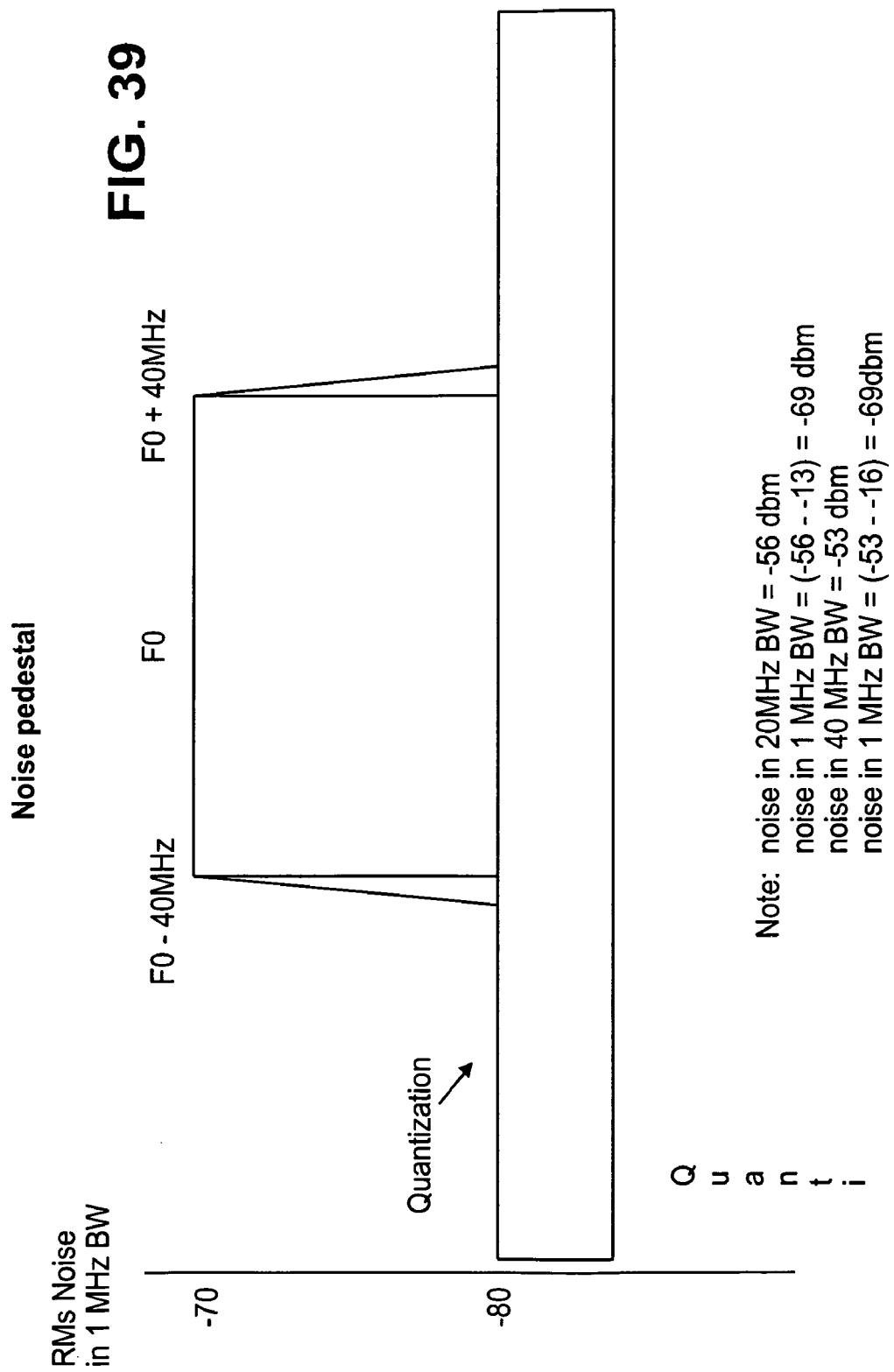

REPEATER TECHNIQUES FOR MULTIPLE INPUT MULTIPLE OUTPUT UTILIZING BEAM FORMERS

CROSS REFERENCE TO RELATED APPLICATIONS

This application is related to and claims priority from pending U.S. Provisional Application No. 60/854,424 filed on Oct. 26, 2006, the contents all of which are incorporated herein by reference. This application is a Continuation in Part (CIP) of: U.S. Patent Publication No. 2005-0286448 (U.S. application Ser. No. 10/516,327) to Proctor et al., which is entitled "WIRELESS LOCAL AREA NETWORK REPEATER;" U.S. Patent Publication No. 2006-0193271 (U.S. application Ser. No. 11/340,838) to Proctor et al., which is entitled "PHYSICAL LAYER REPEATER CONFIGURATION FOR INCREASING MIMO PERFORMANCE;" and U.S. Patent Publication No. 2007-0117514 (U.S. application Ser. No. 11/602,455) to Gainey et al., which is entitled "DIRECTIONAL ANTENNA CONFIGURATION FOR TDD REPEATER," the contents all of which are incorporated herein by reference. This application is related to: U.S. Pat. No. 7,200,134 to Proctor et al., which is entitled "WIRELESS AREA NETWORK USING FREQUENCY TRANSLATION AND RETRANSMISSION BASED ON MODIFIED PROTOCOL MESSAGES FOR ENHANCING NETWORK COVERAGE;" U.S. Patent Publication No. 2006-0195883 (U.S. application Ser. No. 11/340,860) to Proctor et al., which is entitled "PHYSICAL LAYER REPEATER WITH DISCRETE TIME FILTER FOR ALL-DIGITAL DETECTION AND DELAY GENERATION;" and PCT Patent Application No. PCT/US07/19163 to Proctor et al. filed on Aug. 31, 2007, which is entitled "REPEATER HAVING DUAL RECEIVER OR TRANSMITTER ANTENNA CONFIGURATION WITH ADAPTATION FOR INCREASED ISOLATION," the contents all of which are incorporated herein by reference.

TECHNICAL FIELD

The technical field relates generally to wireless communications and more specifically to a repeater for increasing the coverage of wireless networks.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in the physical layer or data link layer as defined by the Open Systems Interconnection Basic Reference Model (OSI Model).

A physical layer repeater designed to operate within, for example, a TDD based wireless network such as Wi-max, generally includes antenna modules and repeater circuitry for simultaneously transmitting and receiving TDD packets. Preferably, the antennas for receiving and transmitting as well as the repeater circuitry are included within the same package in order to achieve manufacturing cost reductions, ease of installation, or the like. This is particularly the case when the repeater is intended for use by a consumer as a residential or small office based device where form factor and ease of installation is a critical consideration. In such a device, one antenna or set of antennas usually face, for example, a base station, access point, gateway, or another antenna or set of antennas facing a subscriber device.

For any repeater which receives and transmits simultaneously, the isolation between the receiving and transmitting antennas is a critical factor in the overall performance of the repeater. This is the case whether repeating to the same frequency or repeating to a different frequency. That is, if the receiver and the transmitter antennas are not isolated properly, the performance of the repeater can significantly deteriorate. Generally, the gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but the antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on the same frequencies and the band pass filtering does not provide additional isolation.

The same issues pertain to frequency translation repeaters, in which receive and transmit channels are isolated using a frequency detection and translation method, thereby allowing two Wireless Local Area Network (WLAN) IEEE 802.11 units to communicate by translating packets associated with one device at a first frequency channel to a second frequency channel used by a second device. The frequency translation repeater may be configured to monitor both channels for transmissions and, when a transmission is detected, translate the received signal at the first frequency to the other channel, where it is transmitted at the second frequency. Problems can occur when the power level from the transmitter incident on the front end of the receiver is too high, thereby causing inter-modulation distortion, which results in so called "spectral re-growth." In some cases, the inter-modulation distortion can fall in-band to the desired received signal, thereby resulting in a jamming effect or de-sensitization of the receiver. This effectively reduces the isolation achieved due to frequency translation and filtering.

Further, in a WLAN environment utilizing the proposed IEEE 802.11n standard protocol, wireless devices rely on multi-path transmissions to increase data rates and range. However, in a typical home WLAN environment, multi-path transmission capability and spatial diversity are limited for many of the same reasons discussed above in connection with lack of performance of wireless products in a home or indoor environment.

SUMMARY

In view of the above problems, a repeater according to a first aspect includes diversity techniques for improving multi-path transmission capability and spatial diversity for a typical home WLAN environment. The repeater can include first and second dipole antennas coupled to first and second transmitters and first and second patch antennas coupled to first and second receivers. The transmitters and receivers can be adapted to increased isolation therebetween based on a transmitted signal measured in the receivers such as a self-generated signal.

A known isolation transmission or reception weight for a given receiver diversity selection can be optimized to achieve higher isolation. Further, a transmission or reception weighting device can apply multiple weightings to allow for optimization of multiple in multiple out (MIMO) signal streams received in different angles of arrival (referred to here as paths). The weighted signals can be combined and transmitted such that the signal predominately received from a first beam formed received pattern is sent out as a first transmit beam formed antenna pattern and any additional signals received simultaneously on other received beam formed patterns are predominately transmitted out on other transmitter antenna patterns via transmitter beam forming simultaneously.

The receiver and/or transmitter patterns can be further optimized in accordance with network traffic signals based on a calculated orthogonal level between the signals received on each beam pattern and/or received MIMO signaling from the transmitting station.

A repeater according to a second aspect includes a dual receiver/transmitter configuration with a multiplexing technique using spectral inversion for improving isolation between transmitter and receiver. A quadrature IF can be provided for each of the two receivers to sum the I channels together and subtract the Q channels to cause a spectral inversion on one of the two reception signals. The composite I and Q channels can then be digitized and separated back into their constituent signals via digital processing involving frequency shifts and filtering.

The repeater according to the first or second aspect can further include a synthesizer and digital frequency generator for controlling weightings applied to transmission and reception signals.

A repeater according to a third aspect the repeater can include a data port available to a client device to permit dual use of the processor with customer specific applications.

A repeater according to a fourth aspect is a multi-channel radio frequency (RF) repeater using wideband analog to digital (ADC) and digital to analog (DAC) conversion.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

FIG. 4 is a table illustrating exemplary gain requirements for the digital to analog converter (DAC) for the exemplary repeater.

FIG. 19 is an illustration of exemplary reception signal combining.

FIGS. 28-33 are illustrations of the frequency spread of the low frequency synthesizer for various pole configurations.

FIG. 35 is an illustration of the frequency spread for the frequency synthesizer.

FIG. 39 is an illustration of the noise pedestal.

DETAILED DESCRIPTION

Figure 1:
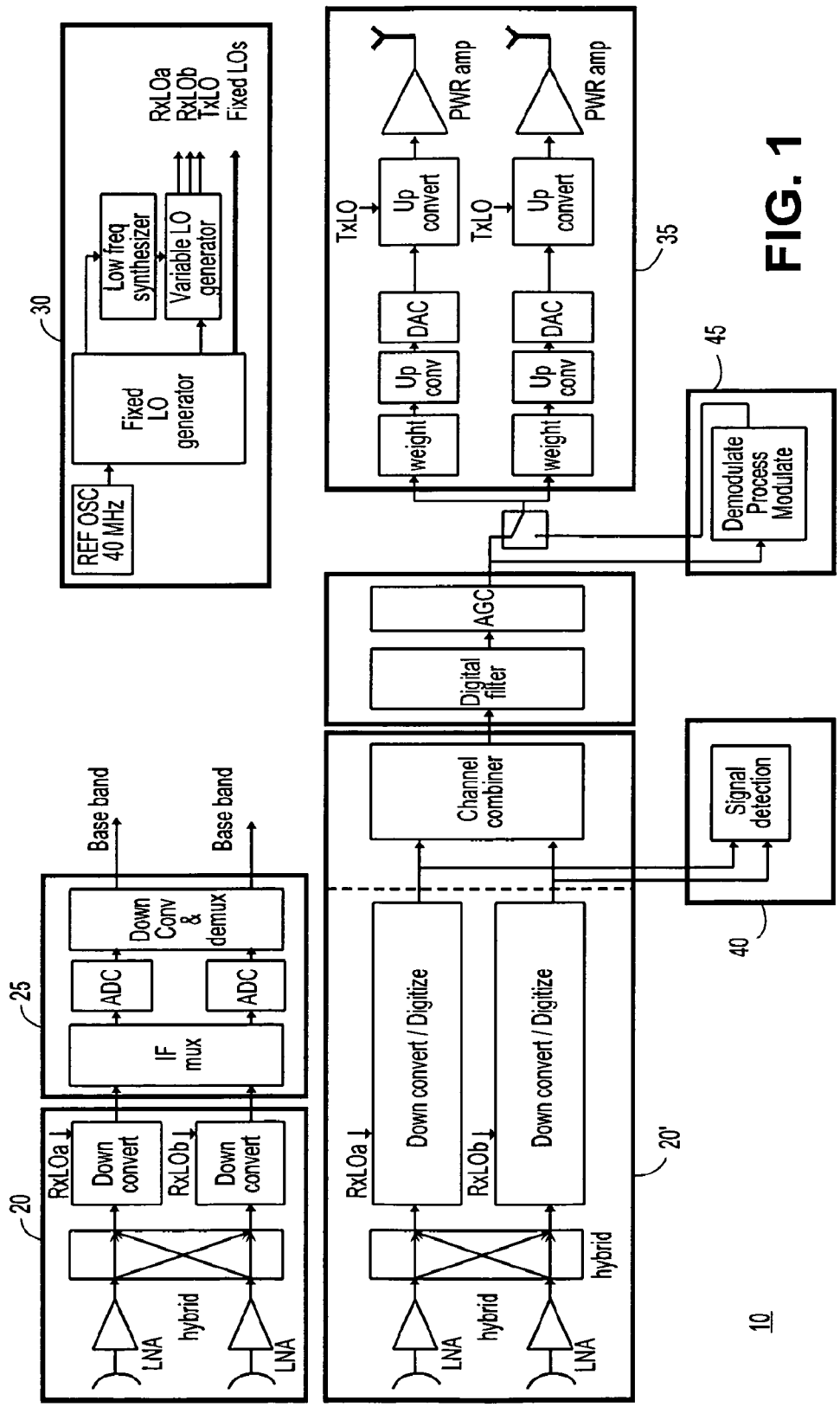
FIG. 1 is a block diagram of internal components of an exemplary repeater in accordance with various exemplary embodiments.
Figure 2:
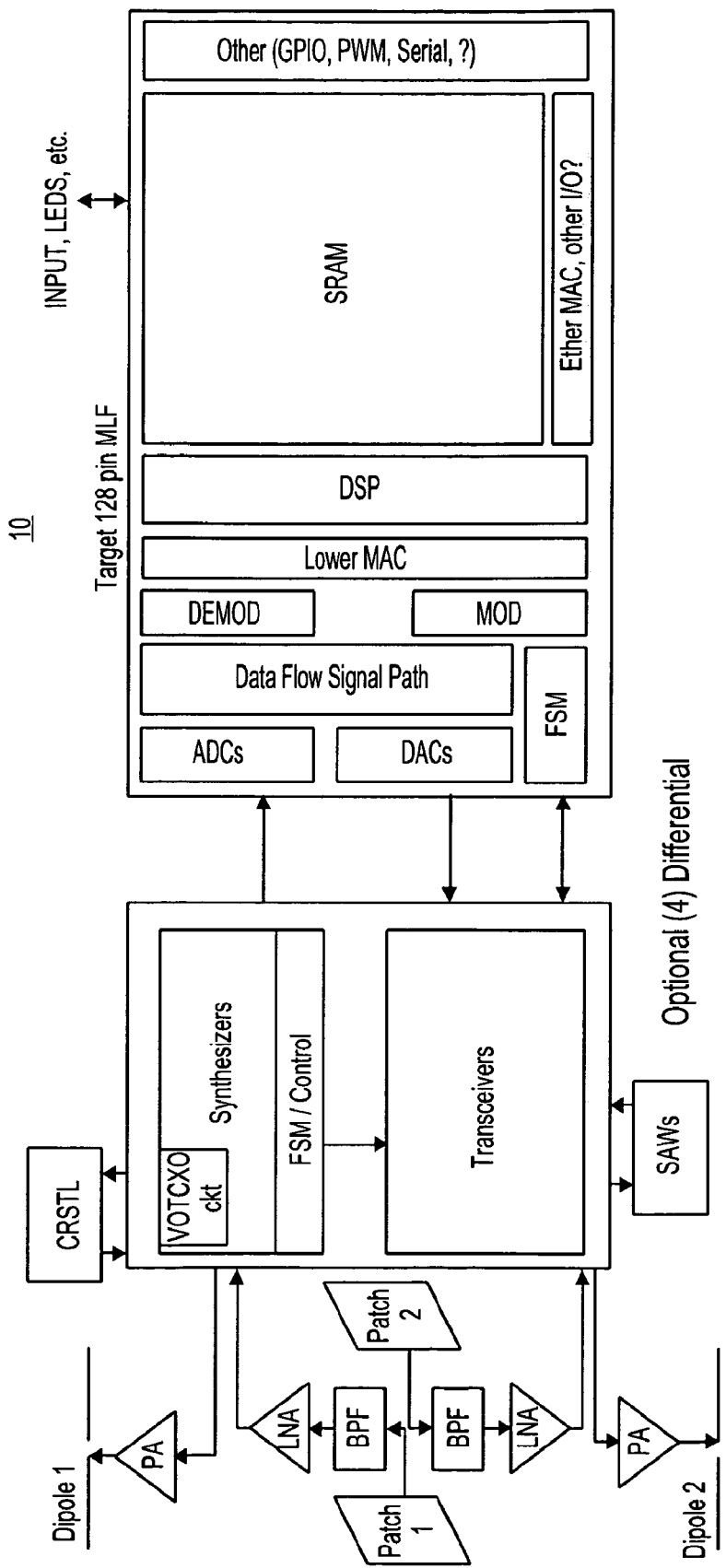
FIG. 2 is a block diagram of internal and external components of the exemplary repeater.

Referring to the block diagram of FIG. 1, a repeater 10 according to various novel embodiments will be discussed. The repeater 10 can include a dual receiver/down converter 20 coupled to an intermediate frequency (IF) multiplexer 25, a synthesizer or linear oscillator (LO) 30 for generating LO signals, a dual transmitter/up converter 35, a signal detection device 40 and a demodulate process modulate device 45. The repeater 10 can alternatively include a dual receiver/down converter 20' which includes a channel combiner and is coupled to a digital filter and adjustable gain control (AGC) device. As shown in the block diagram of FIG. 2, the repeater 10 can include dipole antennas as the transmission antennas and patch antennas as the reception antennas.

Figure 3:
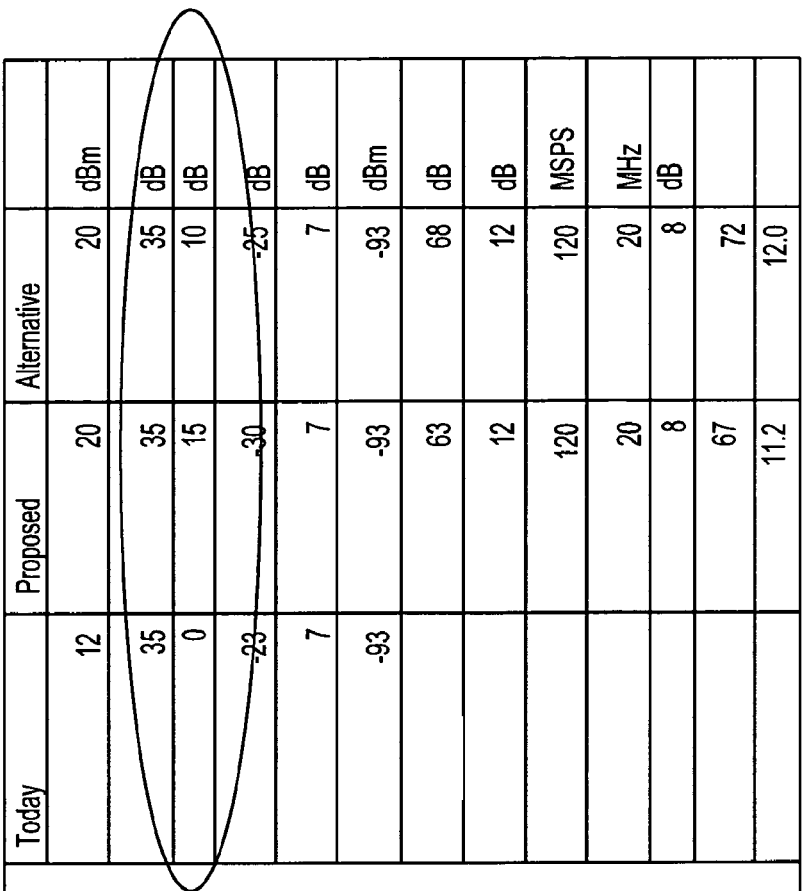
FIG. 3 is a table illustrating exemplary gain requirements for the analog to digital converter (ADC) for the exemplary repeater.

Returning to FIG. 1, the dual receiver/down converter 20 includes analog to digital converters (ADC) and the dual transmitter/up converter 35 includes digital to analog converters (DAC). Exemplary gain requirements for the ADC and DAC are shown in FIGS. 3 and 4.

Figure 5A:
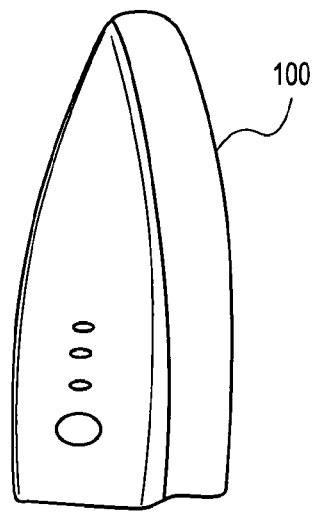
FIG. 5A is a diagram illustrating an exemplary enclosure for a dipole dual patch antenna configuration.
Figure 5B:
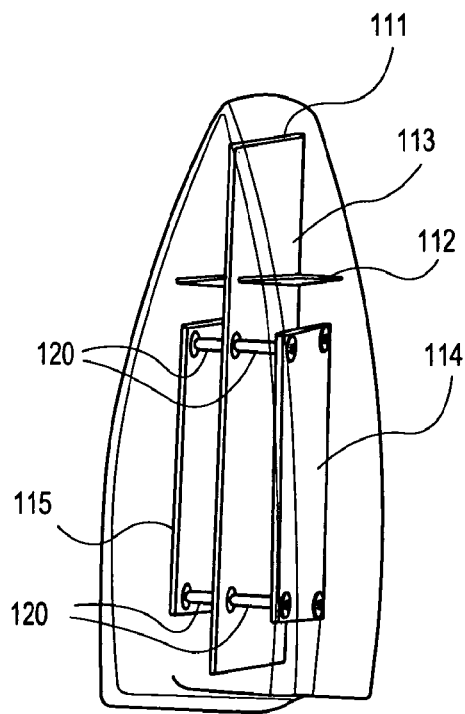
FIG. 5B is a diagram illustrating an internal view of the enclosure of FIG. 5A.

Referring to FIGS. 5A-5B, the repeater 10 can include a dipole dual patch antenna configuration along with the repeater electronics efficiently housed in a compact enclosure 100. Each of the patch antennas 114 and 115 are arranged in parallel with the ground plane 113 and can be printed on wiring board or the like, or can be constructed of a stamped metal portion embedded in a plastic housing.

Figure 5C:
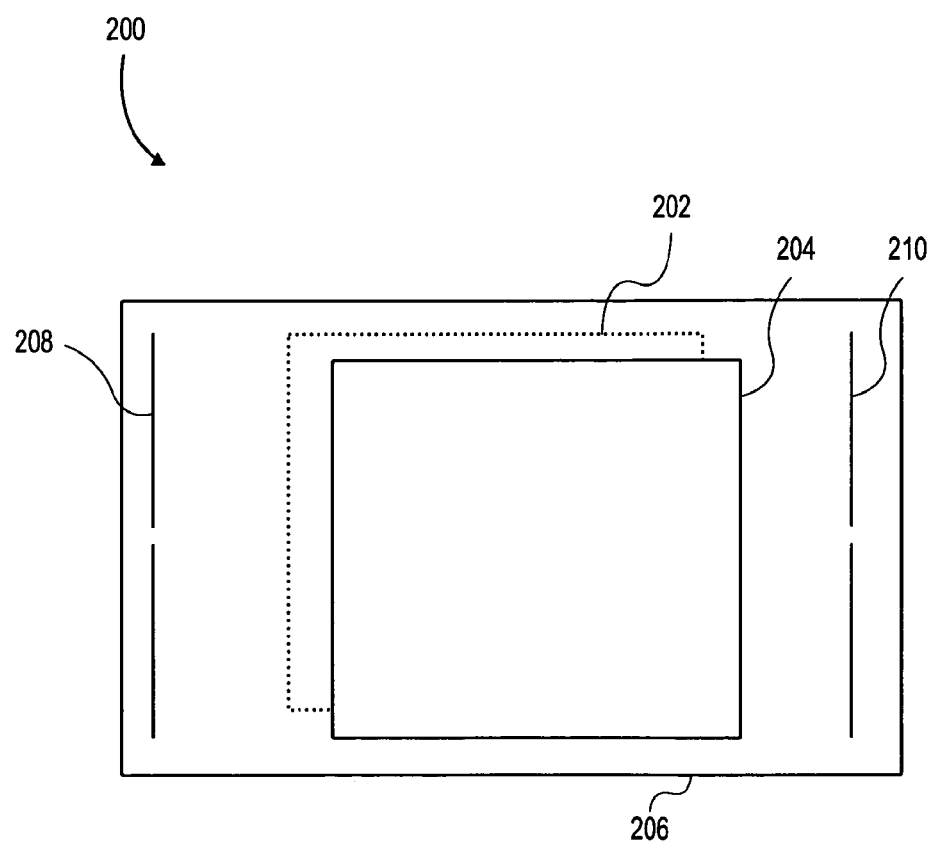
FIG. 5C is a block diagram of a testing apparatus used to test a transmitter based adaptive antenna configuration.

Referring to FIG. 5C, the repeater can include an exemplary dual dipole dual patch antenna configuration 200 including first and second patch antennas 202, 204 separated by a PCB 206 for the repeater electronics.

Figure 5D:
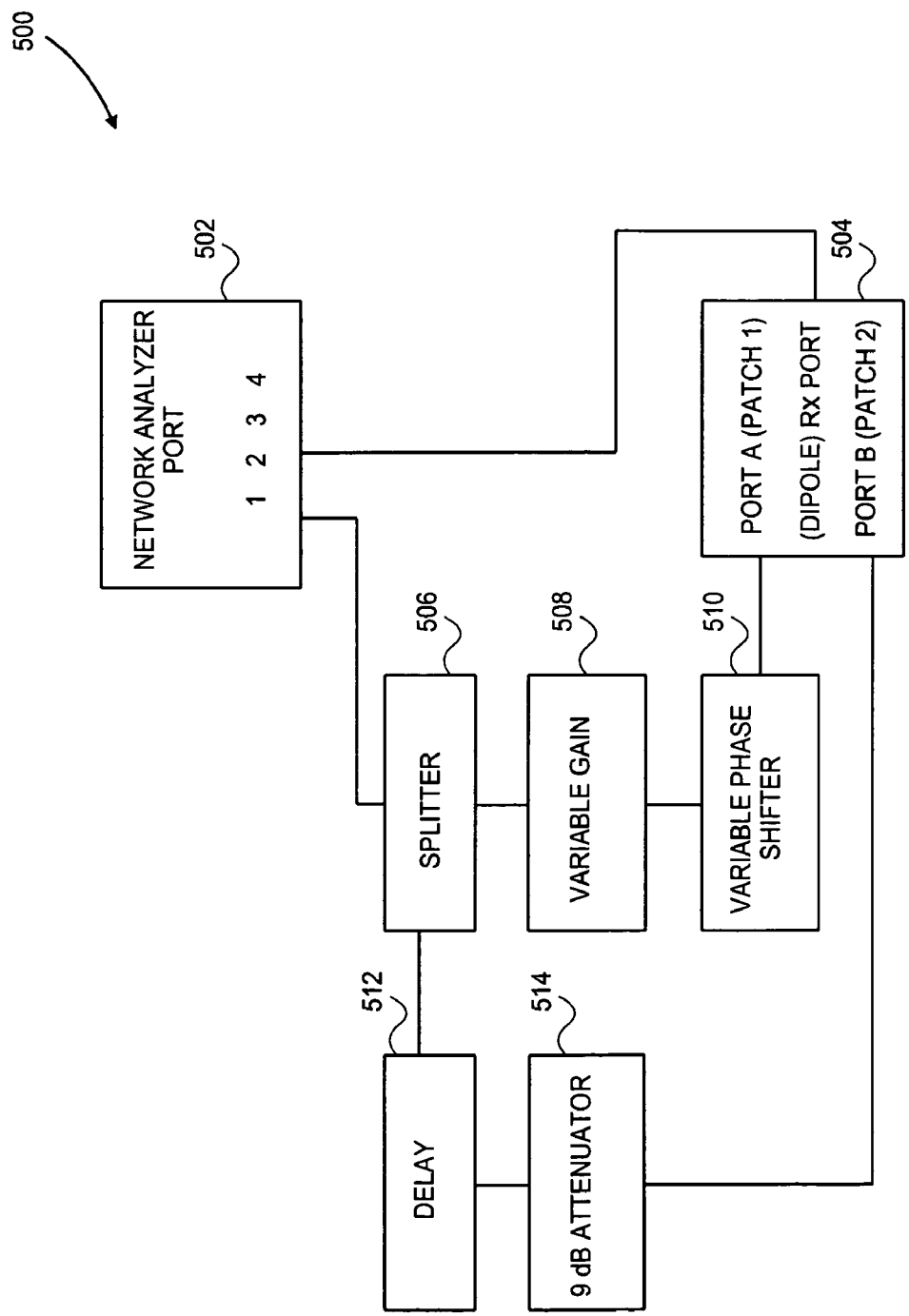
FIG. 5D is a diagram illustrating an exemplary dual dipole dual patch antenna configuration.
Figure 6A:
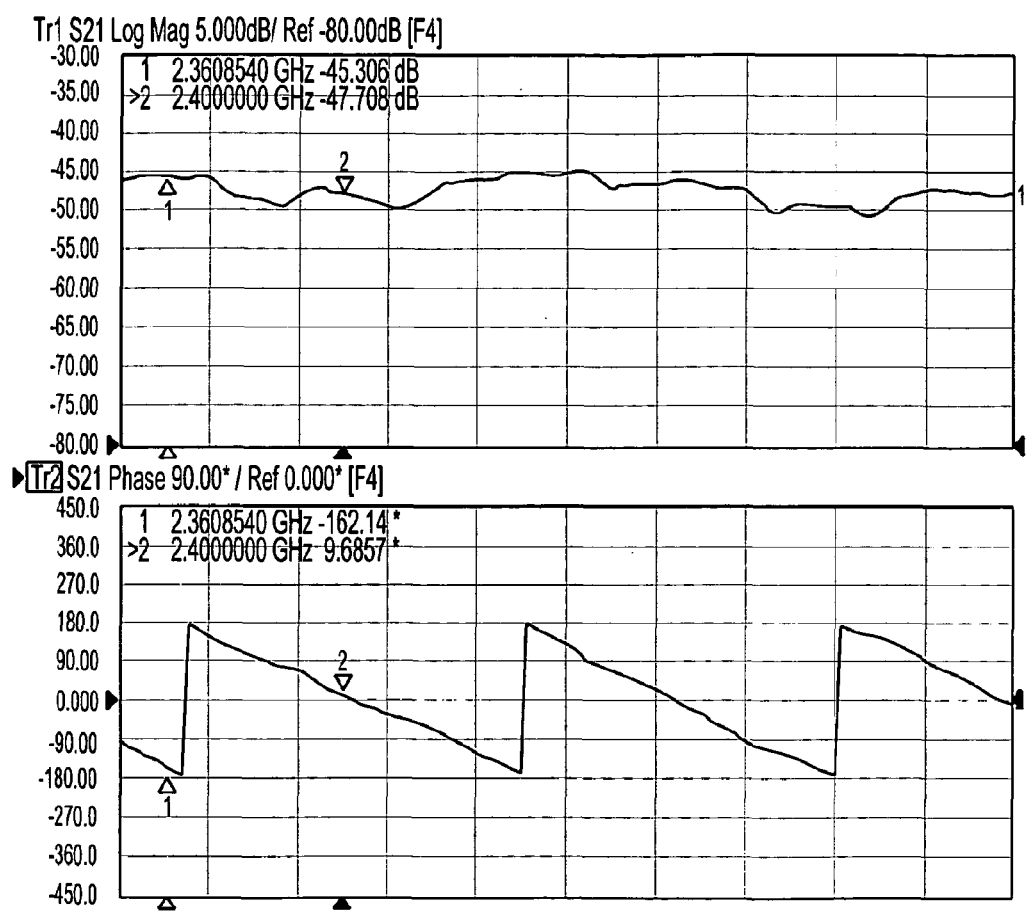
FIGS. 6A-6B are graphs illustrating the gain versus frequency and phase shift versus frequency for the antenna with no adaptation and with adaptation.
Figure 6B:
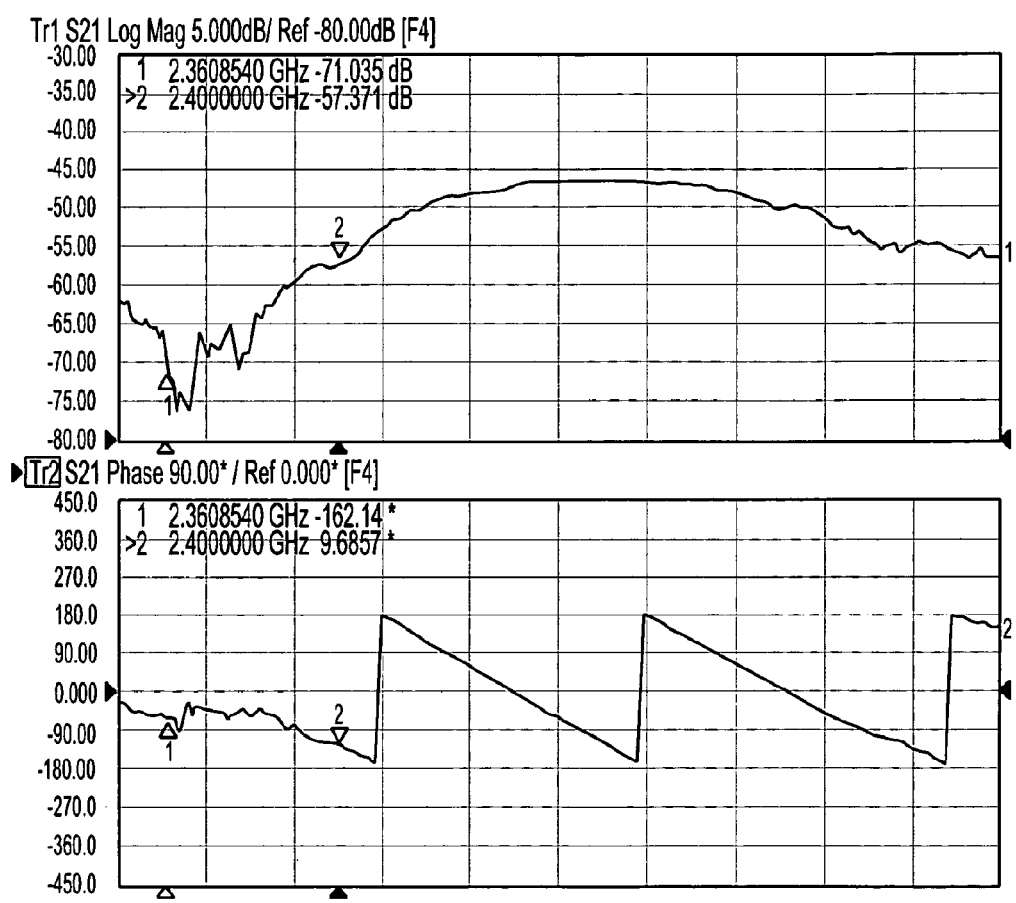
Figure 7:
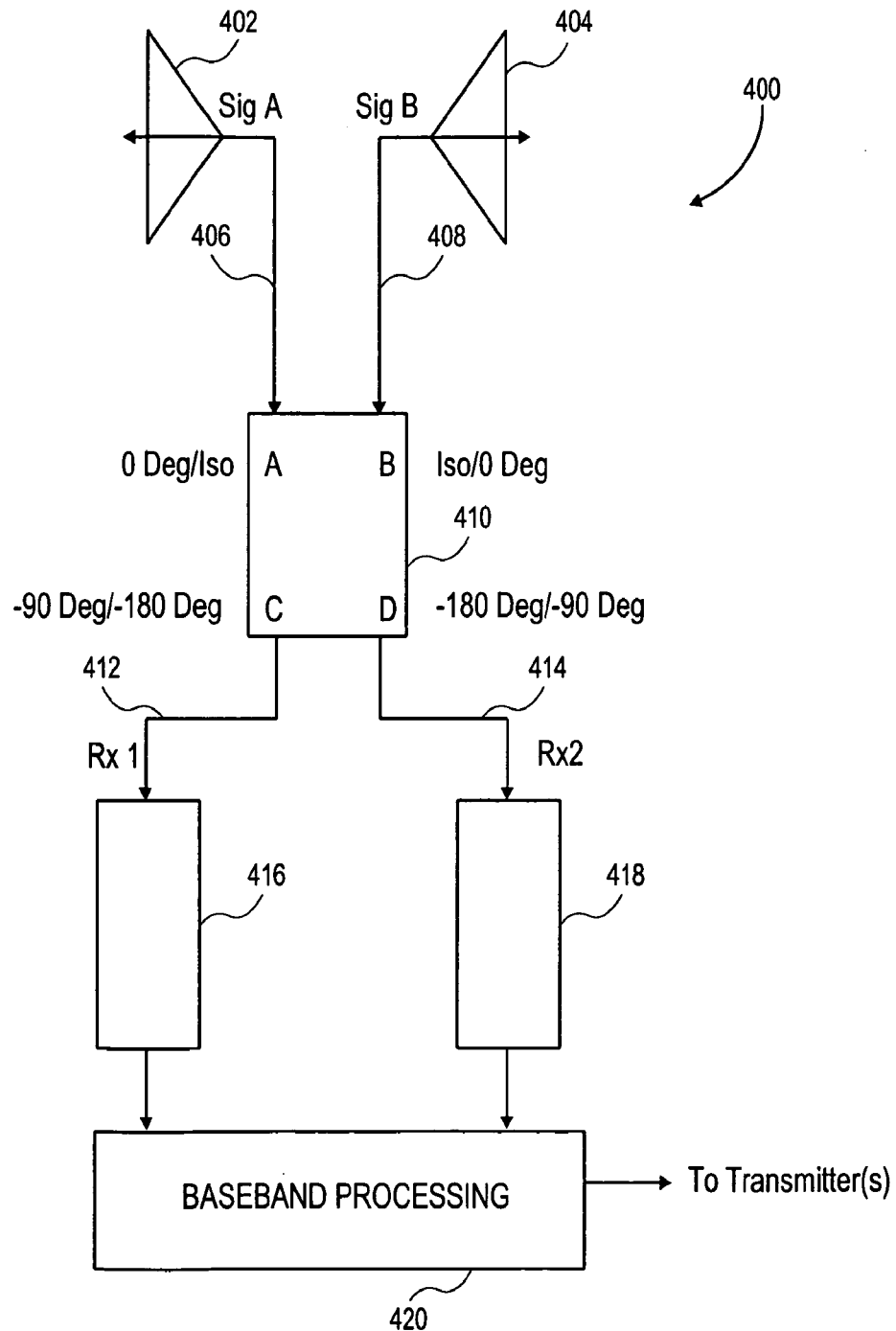
FIG. 7 is a block diagram of a receiver based adaptive antenna configuration in accordance with various exemplary embodiments.

The inventors performed several tests demonstrating the higher isolation achieved by an adaptive antenna configuration. FIG. 5D is a block diagram of a test adaptive antenna configuration used to test isolation achieved by an antenna configuration similar to the one shown in FIG. 5B. Referring to FIGS. 6-7, the path loss was measured at 2.36 GHz (marker 1) and at 2.40 GHz (marker 2) for the dipole patch array without the weighting circuit (no adaptation) and for the dipole patch array with the weighting circuit (adaptation) in a location with few signal scattering objects physically near the antenna array 504. The results demonstrated that adjusting the phase and gain setting achieves substantial control of the isolation at specific frequencies. Particularly, marker 1 in FIG. 6A shows −45 dB of S21 path loss when no adaptation is applied, while marker 1 in FIG. 6B showed −71 dB of path loss after tuning of variable phase and gain. The result is an additional 26 dB isolation benefit. Marker 2 in FIG. 6A shows −47 dB of S21 path loss when no adaptation is applied, while marker 2 in FIG. 6B shows −57 dB of path loss after tuning of variable phase and gain. The result is an additional 10 dB isolation benefit.

Referring to FIG. 7, a receiver based adaptive antenna configuration 400 for achieving isolation will be briefly discussed. The configuration 400 includes first and second patch antennas 402, 404 and a 90° hybrid directional coupler 410 for combining the signals A, B on paths 406, 408 so that first and second receivers 416, 418 receive a different algebraic combination of the signals A, B. The outputs of the first and second receivers 416, 418 are coupled to a baseband processing module 420 for combining the signals to perform a beam forming operation in digital baseband. The first receiver 416 and the second receiver 418 are tuned to different frequencies until a signal is detected on one of the two frequencies, then the other receiver may be retuned to the detected frequency. The first and second receivers 416, 418 can then have weights applied digitally at the baseband processing module 420 and perform a receiver antenna adaptation. The decision of the weighting may be achieved by calculating the "beam formed" or weighed combined signals in multiple combinations simultaneously, and selecting the best combination of a set of combinations. This may be implemented as a fast Fourier transform, a butler matrix of a set of discrete weightings, or any other technique for producing a set of combined outputs, and selecting the "best" from among the outputs. The "best" may be based on signal strength, signal to noise ratio (SNR), delay spread, or other quality metric. Alternatively, the calculation of the "beam formed" or weighed combined signal may be performed sequentially. Further, the combination may be performed in any weighting ratios (gain and phase, equalization) such that the best combination of the signals A, B from the first and second patches antennas 402, 404 is used.

Figure 8:
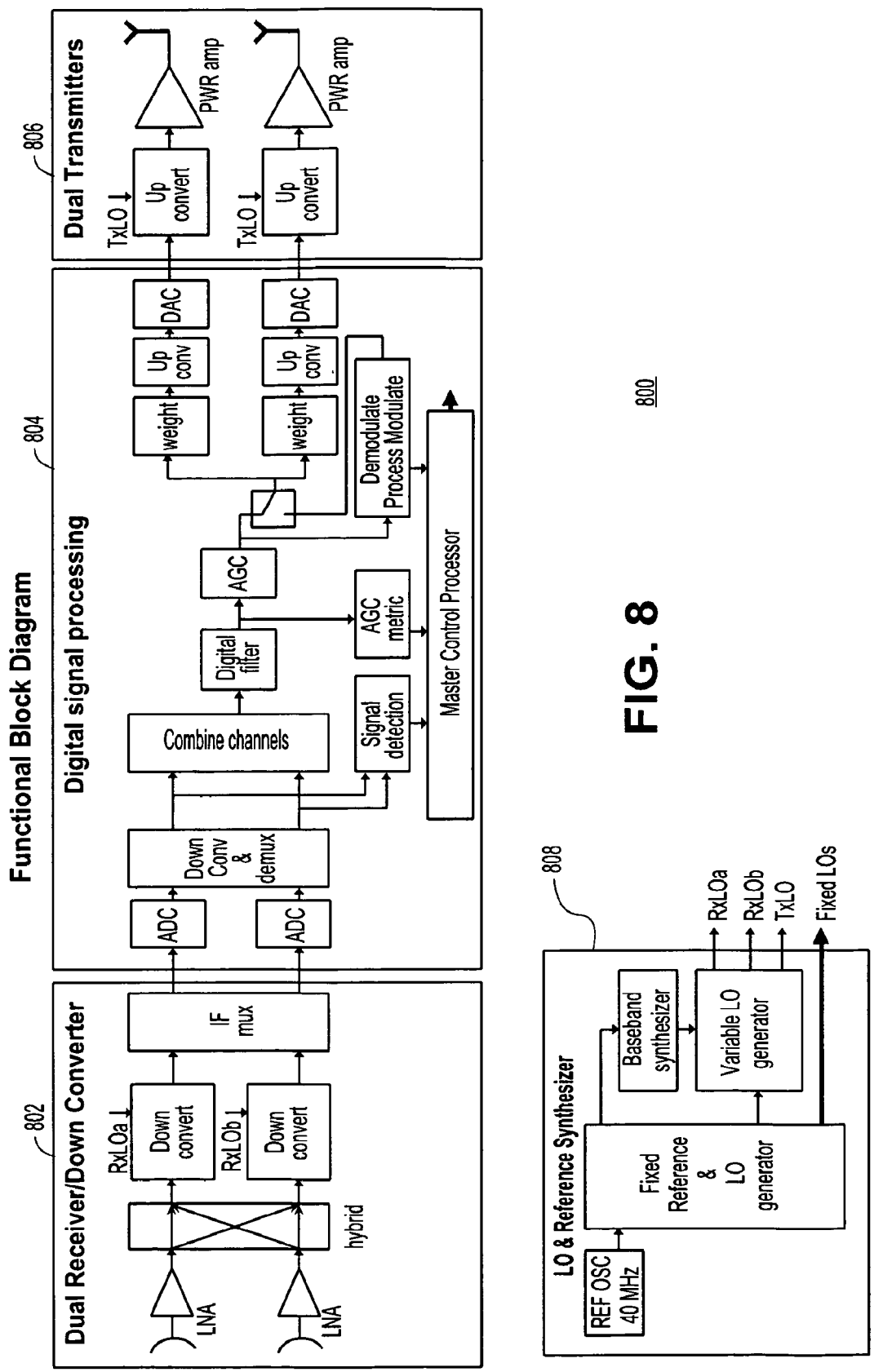
FIG. 8 is a functional block diagram of the exemplary repeater.

Referring to FIG. 8, various embodiments of a repeater 800 will be discussed. The repeater 800 includes a dual receiver/down converter 802, a digital signal processing module 804, a dual transmitter 806, and a LO & Reference Synthesizer 808.

The dual receiver/down converter 802 includes first and second reception antennas which are respectively coupled to first and second low noise amplifiers (LNAs) for amplifying reception signals. The first and second reception antennas can be, for example, patch antennas. The outputs of the LNAs are coupled to a hybrid coupler, which can be configured similarly to the hybrid coupler 410 shown in FIG. 7. The hybrid coupler is coupled to first and second down converters, the outputs of which are coupled to an IF multiplexer.

The digital signal processing module 804 includes first and second ADCs which receive the outputs of the IF multiplexer. The outputs of the first and second ADCs are coupled to a down converter and demultiplexer, the output of which is coupled to a combiner (COMBINE CHANNELS) for combining the channels. A digital filter filters the output signal of the combiner, and an adjustable gain control (AGC) adjusts the signal gain. The digital signal processing module 804 also includes a signal detection circuit for detecting a presence of a signal on the reception channels, an AGC metric for determining parameters for gain adjustment, and a master control processor. The signal from the AGC is output to weight elements and a demodulater/modulator (DEMODULATE PROCESS MODULATE) for performance of any needed signal modulation or demodulation. The weight elements can be analog elements or digital elements. The weight elements are coupled to upconversion circuits, the outputs of which are coupled to the first and second transmitters of the dual transmitters 806 via first and second DACs.

The first and second transmitters of the dual transmitter 806 are coupled to first and second transmission antennas via first and second power amplifiers. The first and second transmission antennas can be, for example, dipole antennas.

The LO & Reference Synthesizer 808 includes a reference oscillator, a fixed reference & LO generator, baseband synthesizer and a variable LO generator for generating the LO signals used by the receivers and transmitters.

Figure 9:
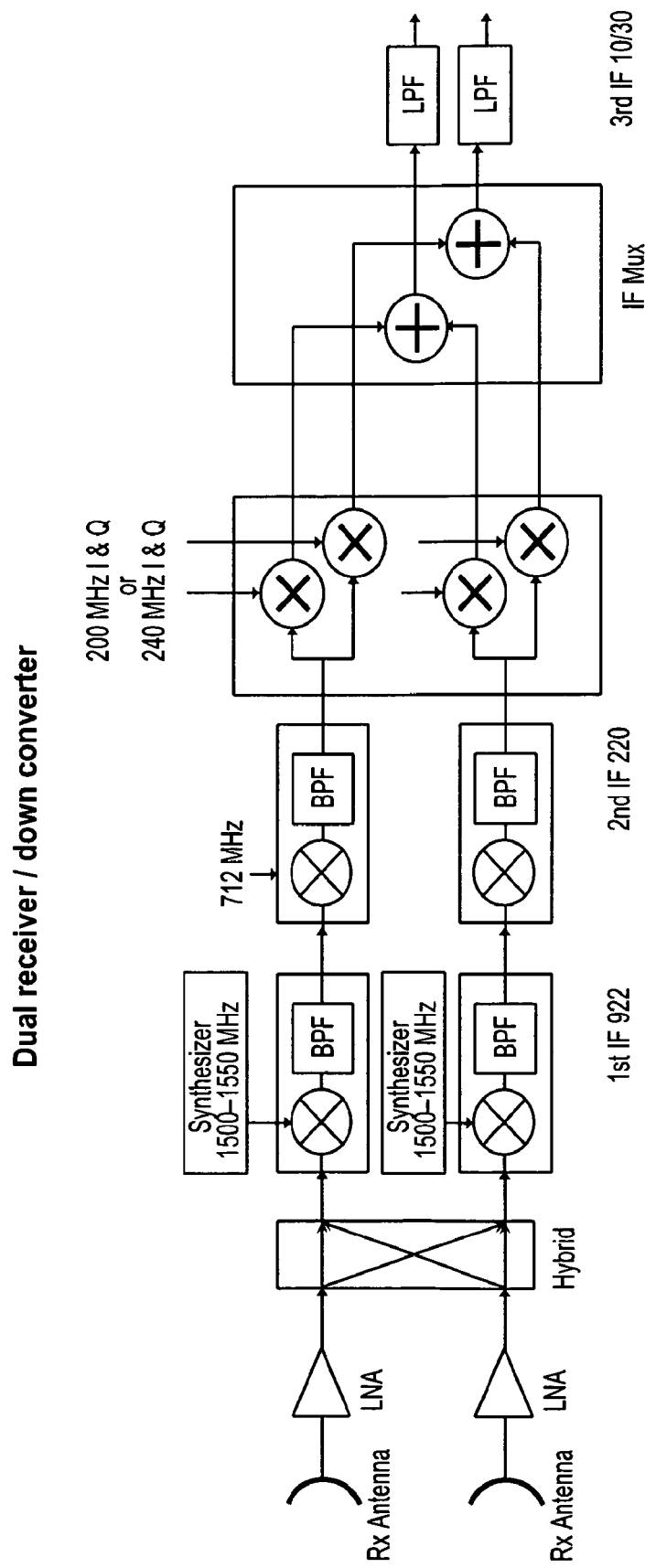
FIG. 9 is a block diagram of the dual receiver/down converter.

The dual receiver/down converter is shown in more detail in FIG. 9. The down converters include a number of mixers coupled to the synthesizer 808 with the outputs passing through band pass filters (BPF).

Figure 10:
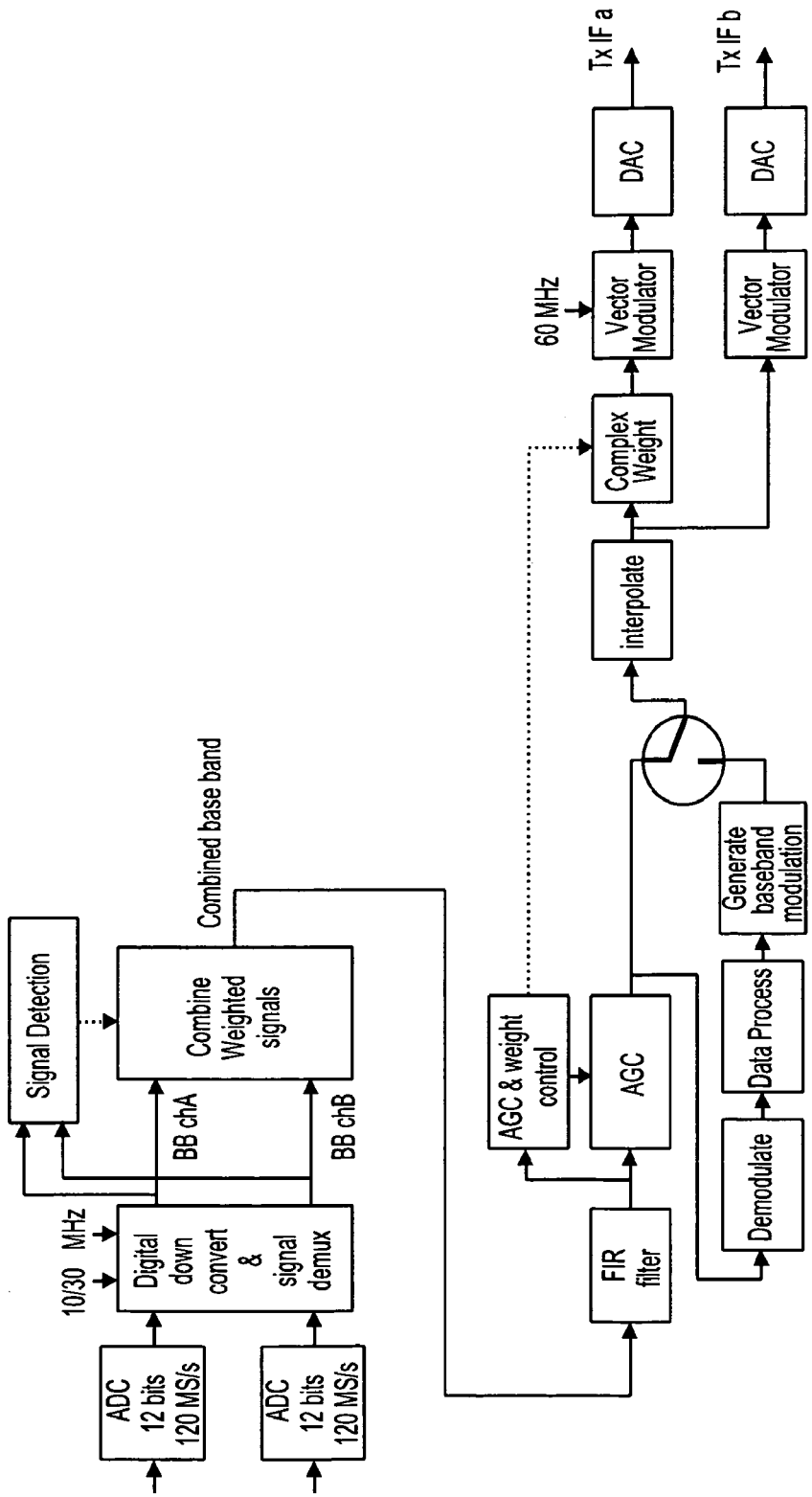
FIG. 10 is a block diagram of the digital signal processing.

The digital signal processing module 804 is shown in more detail in FIG. 10. An AGC and weight control portion can control a complex weight that is coupled to a vector modulator.

Figure 11:
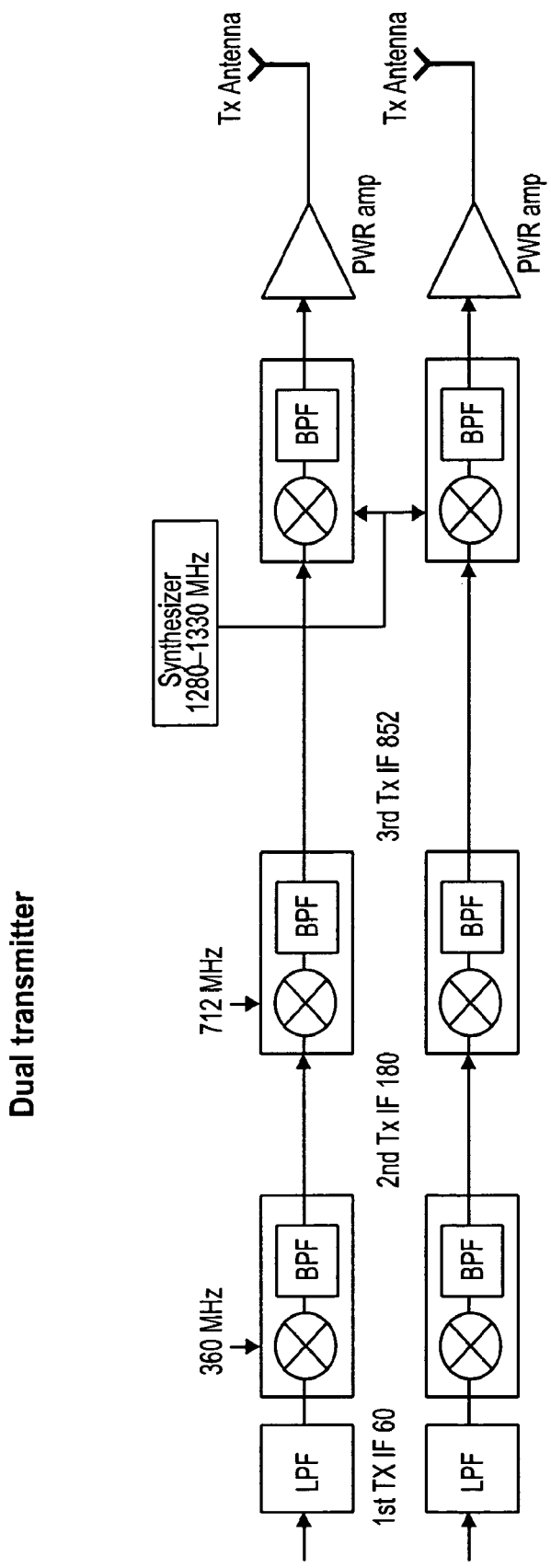
FIG. 11 is a block diagram of the dual transmitter.
Figure 12:
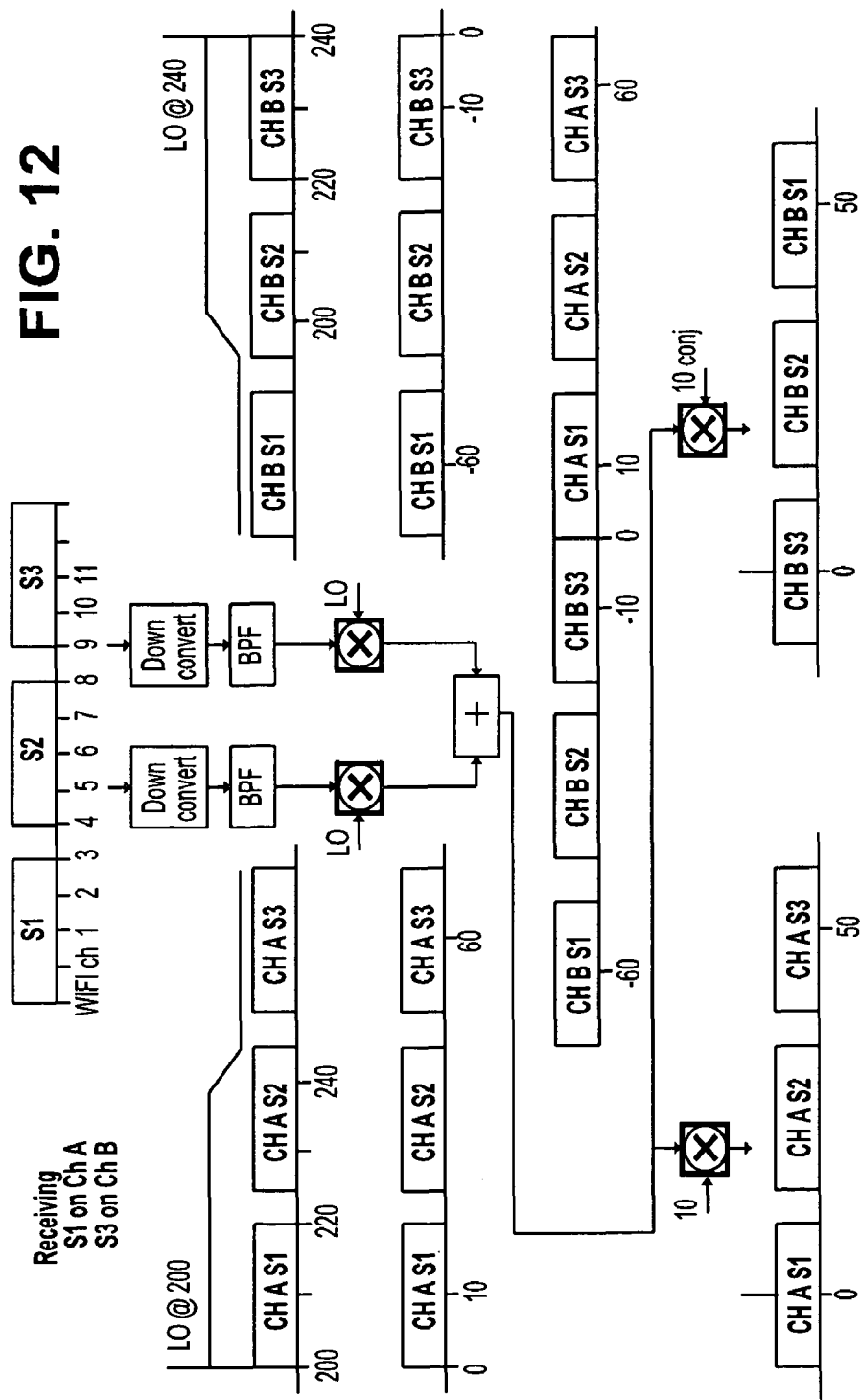
FIGS. 12-17 are diagrams illustrating the signal processing on the various channels performed by the repeater.
Figure 13:
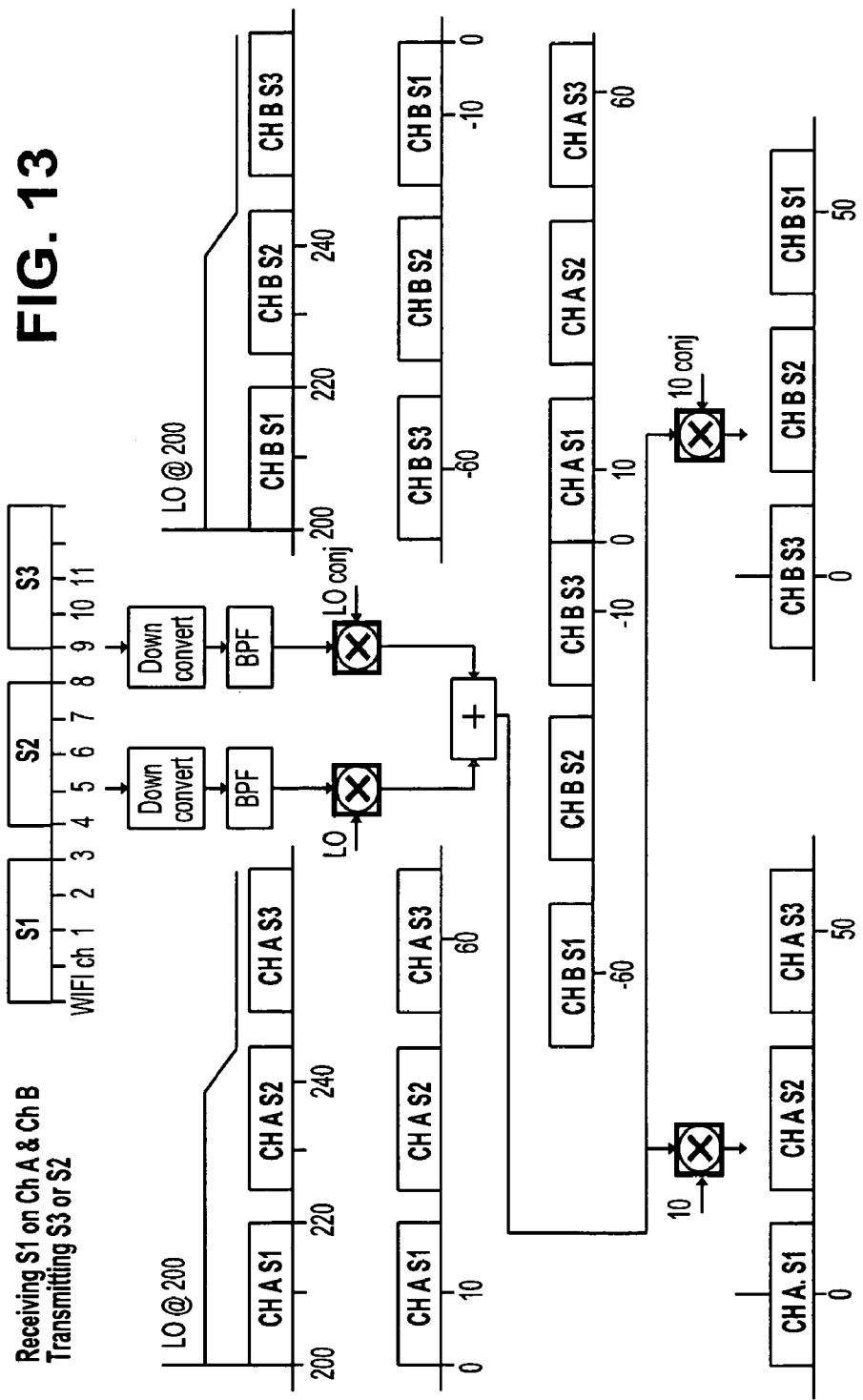
Figure 14:
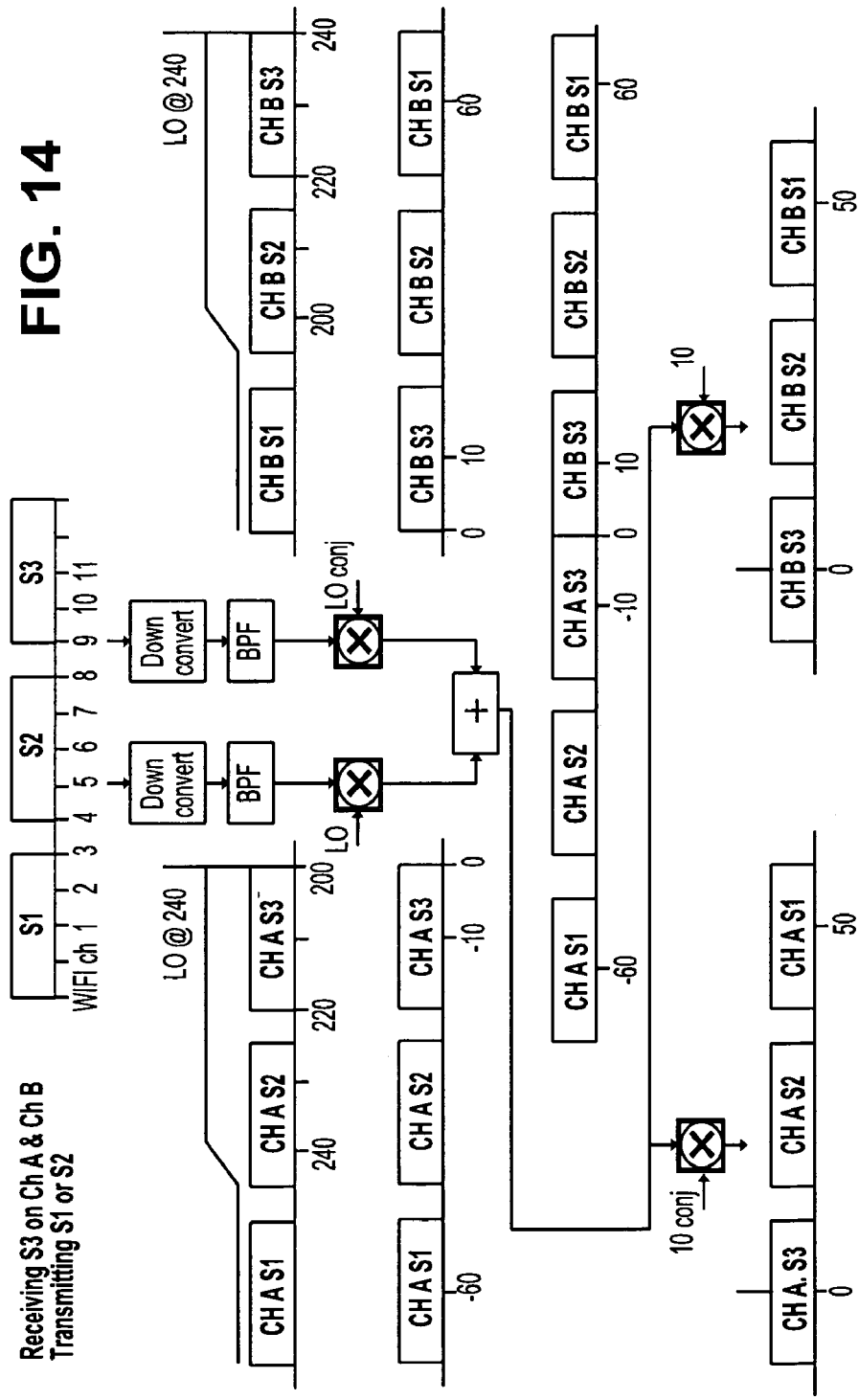
Figure 15:
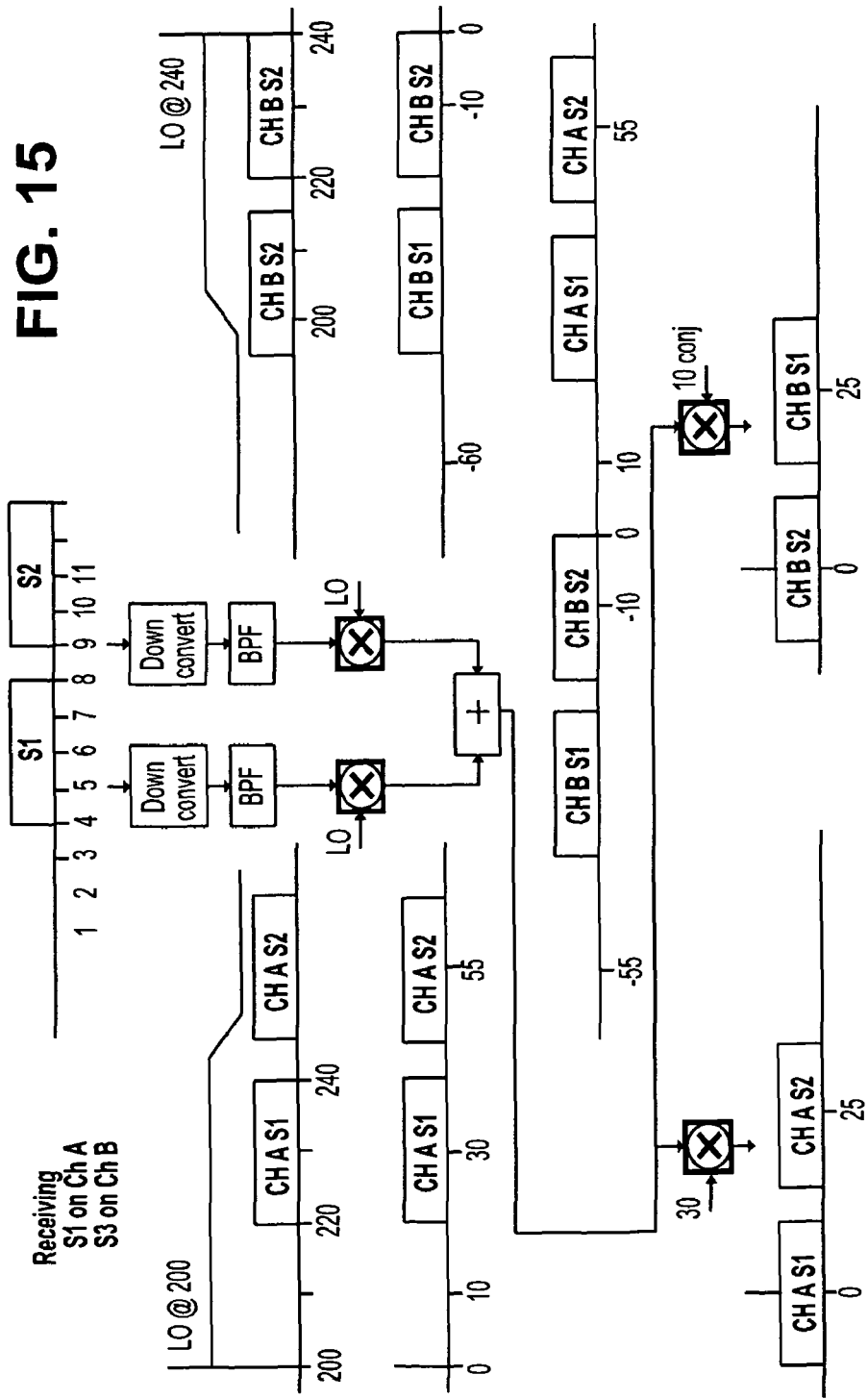
Figure 16:
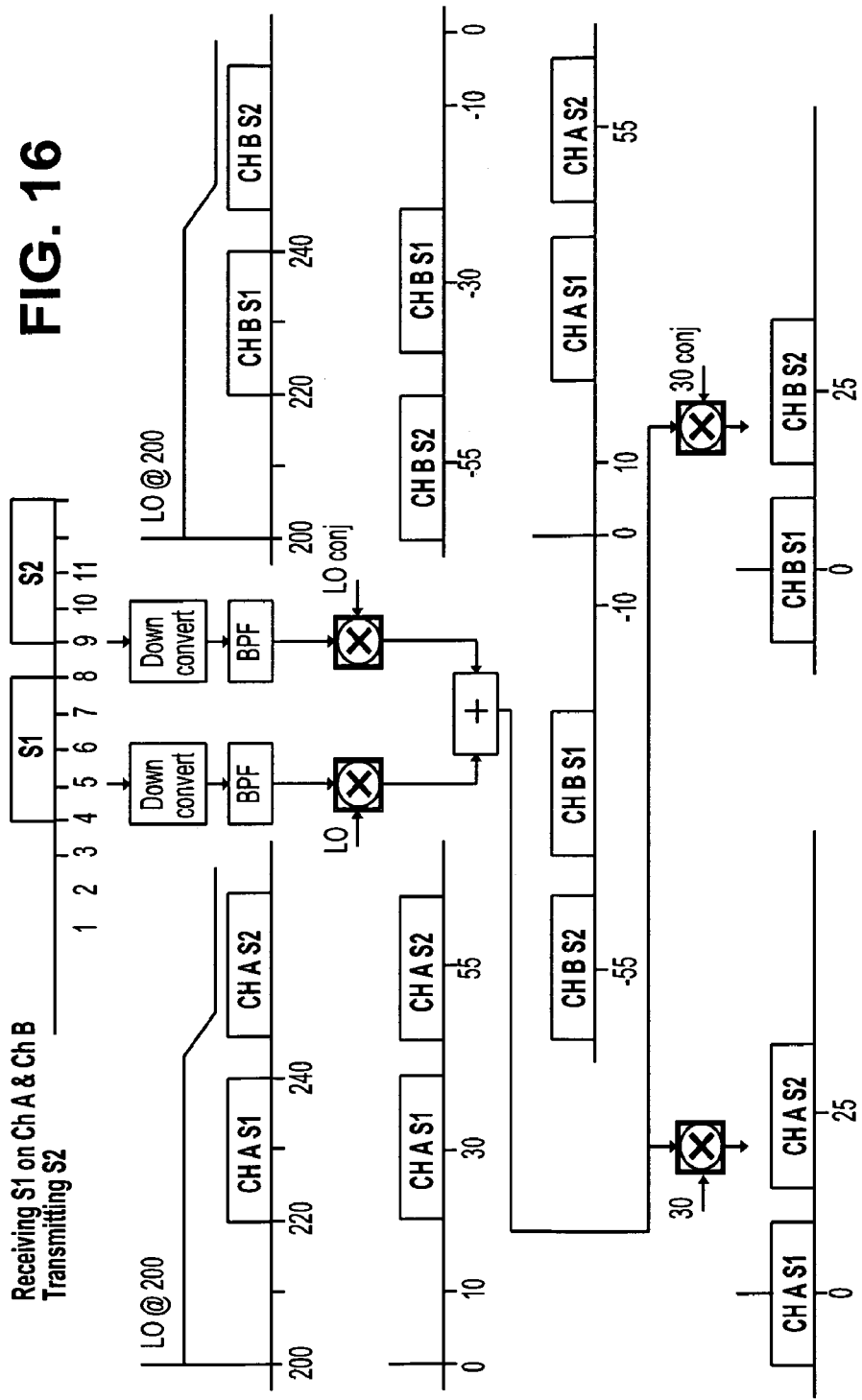
Figure 17:
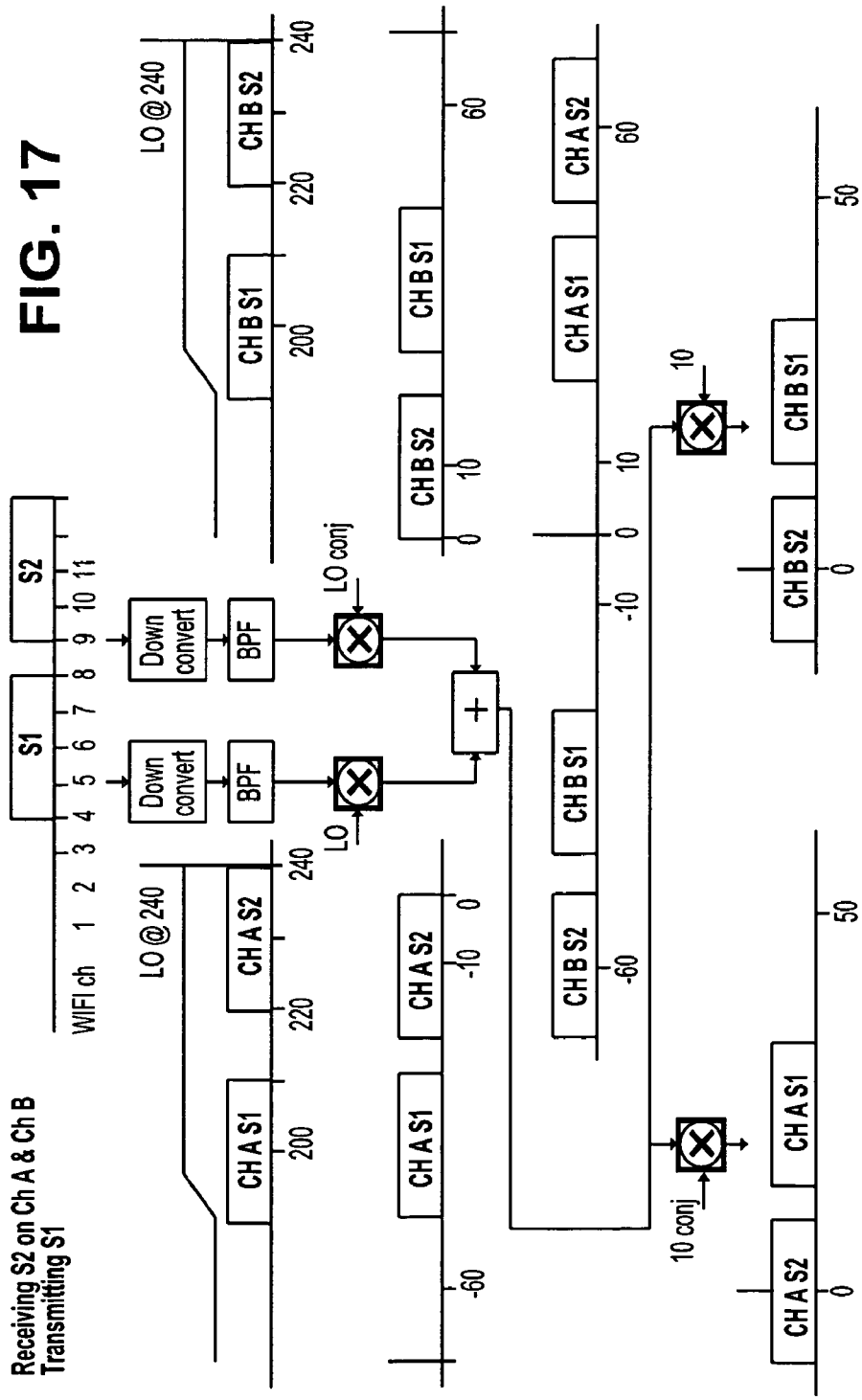

The dual transmitter/up converter is shown in more detail in FIG. 11. The up converters include a number of mixers coupled to the synthesizer 808 with the outputs passing through BPFs.

Figure 18:
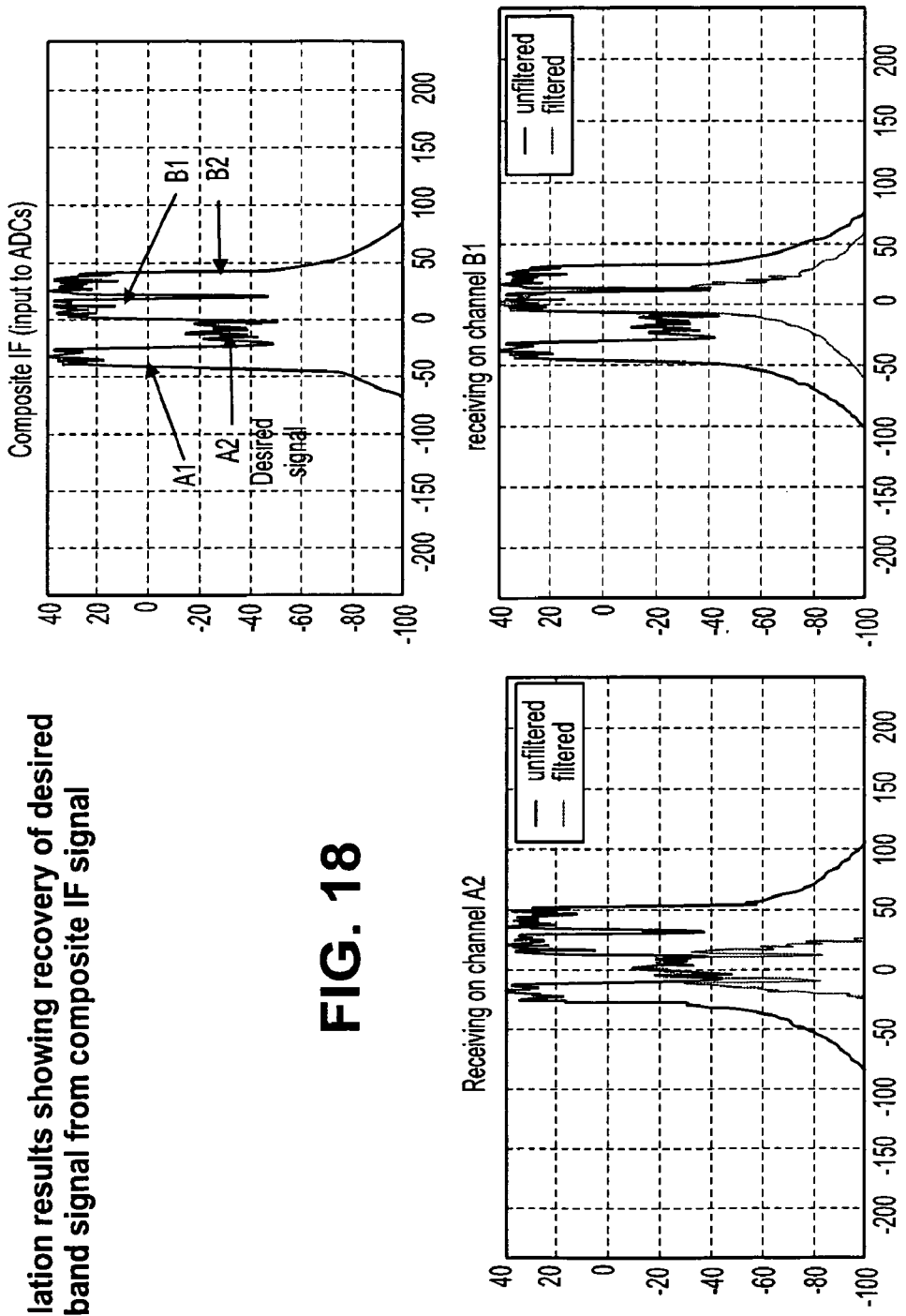
FIG. 18 is an illustration of simulation results of baseband signal recovery from a composite IF signal.

The signal processing operation of the IF multiplexer, ADCs and digital down converter is shown in FIGS. 12-17 for various scenarios in which signals are received on first and second channels. Referring to FIG. 18, simulation results demonstrated recovery of the desired baseband signal from the composite IF signal generated by the IF multiplexer.

Referring to FIG. 19, exemplary reception signal combining performed by the hybrid coupler and the combiner is shown. The hybrid coupler (reception weighting circuit) can apply first and second weights to the reception signals Ra, Rb received on first and second reception paths coupled to the first and second reception antennas respectively to generate a first weighted reception signal and a second weighted reception signal (Sa, Sb). The signal combiner combines the first and second weighted reception signals according to various mathematical combinations to generate a plurality of combined reception signals (So1, So2, So3, So4). A best one of the combined reception signals (So) is output.

Figure 20:
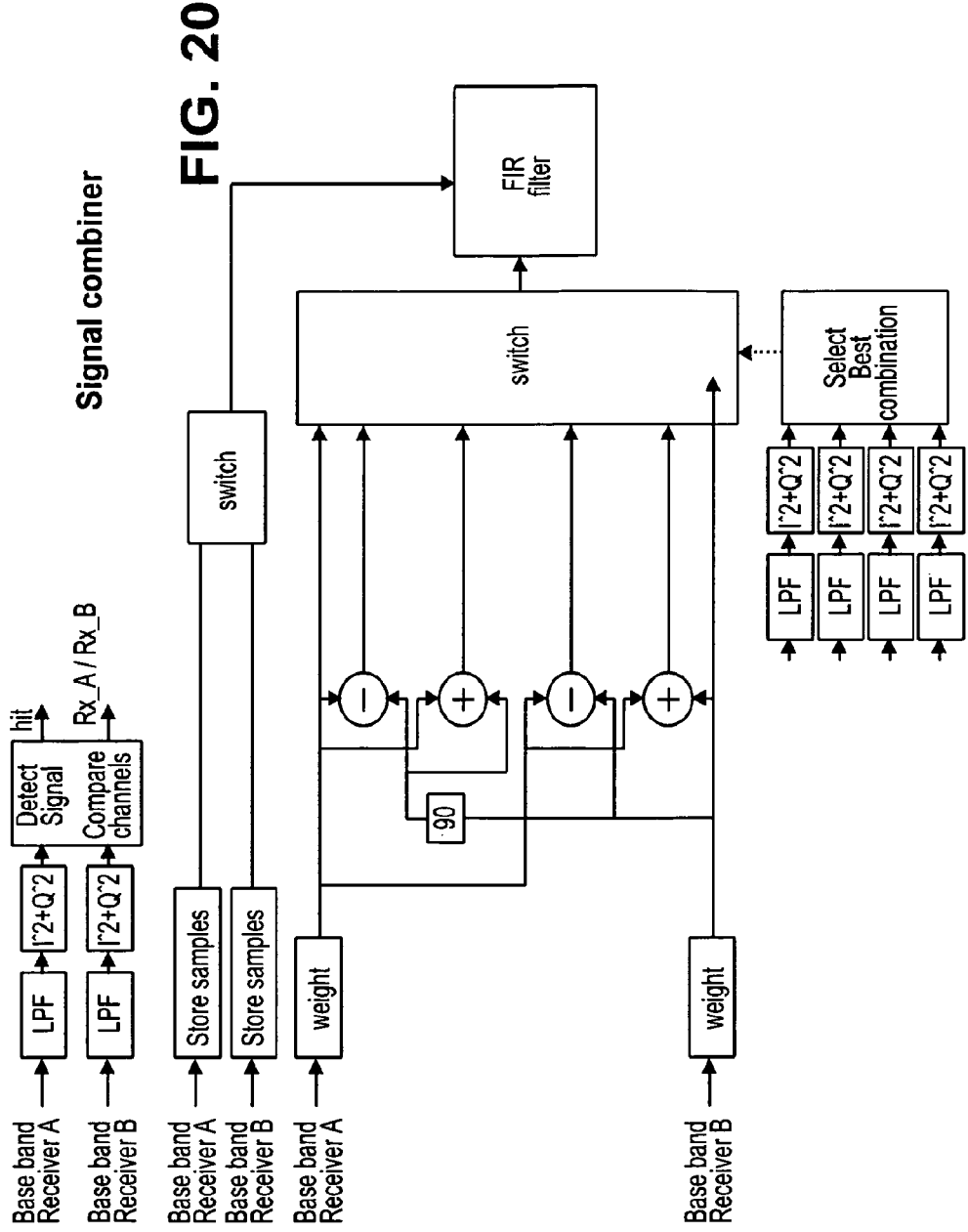
FIG. 20 is a block diagram of an exemplary signal combiner.

The signal combiner is shown in more detail in FIG. 20. The signal combiner can be configured to store a first sample of the reception signal received at the first reception antenna and a second sample of the reception signal received at the second reception antenna and to load one of the first sample or the second sample into a digital filter in accordance with a switch. The switch can be controlled by the signal detection device based upon one of the first reception antenna and the second reception antenna on which the signal detection device detected the presence of the reception signal.

Metrics such as a beacon transmitted by the repeater during normal operation can be used for determining the weight values. For example, for a frequency translating repeater operating on two frequency channels, the receiver can measure received signal strength on one channel while the two transmitting antennas can transmit a self generated signal such as the beacon. The amount of initial transmitter to receiver isolation can be determined during self generated transmissions. The weights can be adjusted between subsequent transmissions using any number of known minimization adaptive algorithms such as steep descent, or statistical gradient based algorithms such as the LMS algorithm to thereby minimize coupling between the transmitters and receiver (increase isolation) based upon the initial transmitter to receiver isolation. Other conventional adaptive algorithms which will adjust given parameters (referred to herein as weights) and minimize a resulting metric can also be used.

Figure 21:
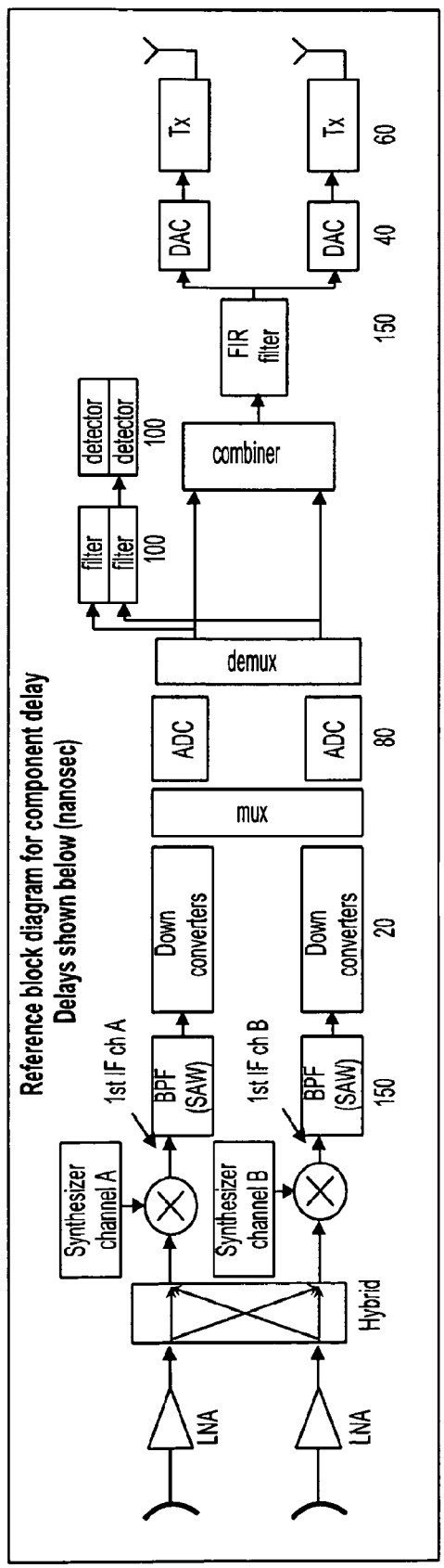
FIG. 21 is a block diagram of components of the repeater including associated component delay.

Referring to FIG. 21, delays of each of the components of the repeater are shown. The delay budget adds up to approximately 600 ns. The delays are clearly dominated by filters. If the IF BPF is assumed to be a (high loss) SAW with 150 ns delay, the overall delay can be reduced by 100 ns by eliminating the SAW. The detector filters are long FIR filters to provide substantially all of the adjacent channel rejection for the detectors. The SAWs with 40 MHz BW provide no delay when operating at 20 MHz BW. The FIR filter at base band is also has substantial delay because it must reject adjacent channel interference and provide linear phase (or correct for phase non linearity of preceding filters). However, this delay can be reduced by preloading this filter with stored samples after a signal is detected. Therefore, its delay is not included in the delay budget.

Figure 22:
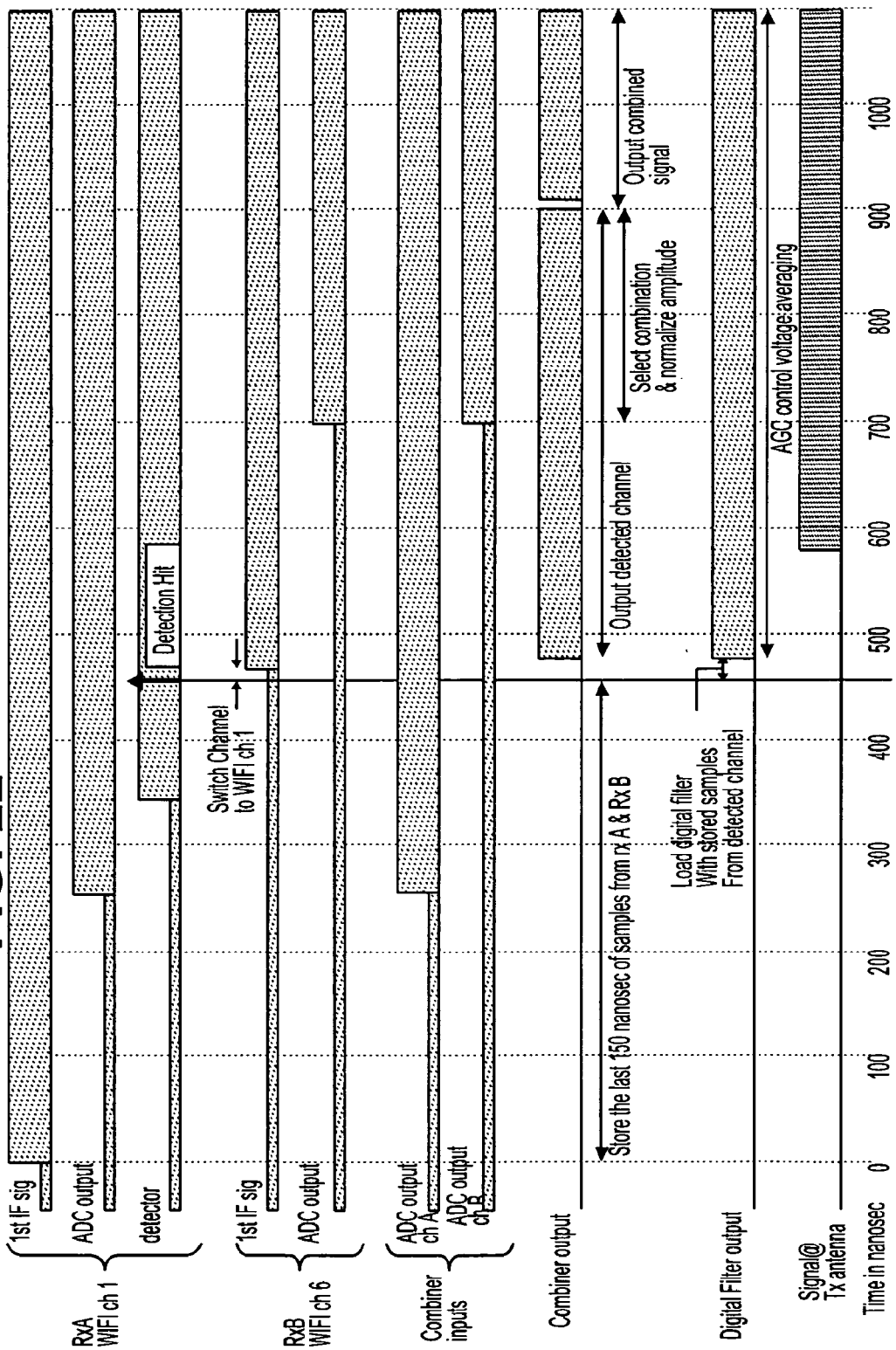
FIG. 22 is an illustration of an exemplary operational timing diagram of the repeater.

Referring to FIG. 22, a timing operation for sample by sample repeating is shown. The t=0 starting time is defined as the time at which the first symbol of the packet preamble (in the reception signal) arrives at the first IF of receiver A. At t=250 ns the first symbol exits the ADCs and enters the detector filter & detector. At t=450 ns the packet is detected. At the same time, receiver B was listening for packets on a different WIFI frequency channel but did not (in this example) receive anything. When receiver A detected a signal, receiver B was switched to the same WIFI channel as receiver A so that both receivers receive the same signal via different paths. A control circuit (not shown) can be coupled to the signal detection device, the receivers or antennas to switch the frequencies in accordance with the detection of the signal detection device.

At t=700 the signal on receiver B exits the ADC. The ADC outputs from both receivers are connected to the combiner. The signal from receiver A arrives at t=250 ns and the signal from receiver B arrives at t=700 ns later, not because the signal from receiver B is late, but because receiver B was tuned to the "wrong" channel. The combiner contains two memories which store samples of the last 150 ns of the signal from receiver A and the last 150 ns of the signal from receiver B. When a detection hit occurs, the combiner quickly loads the digital filter with the stored samples from the appropriate receiver (in this case receiver A). It then begins outputting samples from receiver A during t=450 ns and t=475 ns.

At t=700 ns the signal from receiver B arrives. The combiner begins the process of selecting the best of several input signal combinations, and at t=900 ns the best combination is selected. The amplitude of the combined signal is adjusted to match that of signal from receiver A. The combined signal is substituted for the signal from receiver A and outputted to the digital filter.

The digital filter output starts at t=475 ns (shortly after detection). It consists of 150 ns of stored samples of the signal from receiver A and 400 ns of current samples of signal A followed by samples of the combined signal. The digital filter output is adjusted by the AGC to provide a constant output at the transmission antenna of approximately 20 dbm samples of the signal at the output of the digital filter. The samples are averaged to produce the AGC control voltage. The initial average starts with the average of the stored samples and, as more samples are added to the average, the process continues. Finally, the signal at the transmission antenna is the digital filter output delayed by the DAC and transmitter delays. It starts at t=575 ns.

Generally, at t=0 the first symbol of a WIFI packet arrives at the Rx antenna(s) and at t<=575 ns the transmission signal leaves the transmission antenna(s). Although the Tx signal is initially not a perfect replica of the Rx signal, it closely replicates the signal. Further, the Tx signal improves with time (signal combining improves SNR and AGC averaging time is longer).

Figure 23:
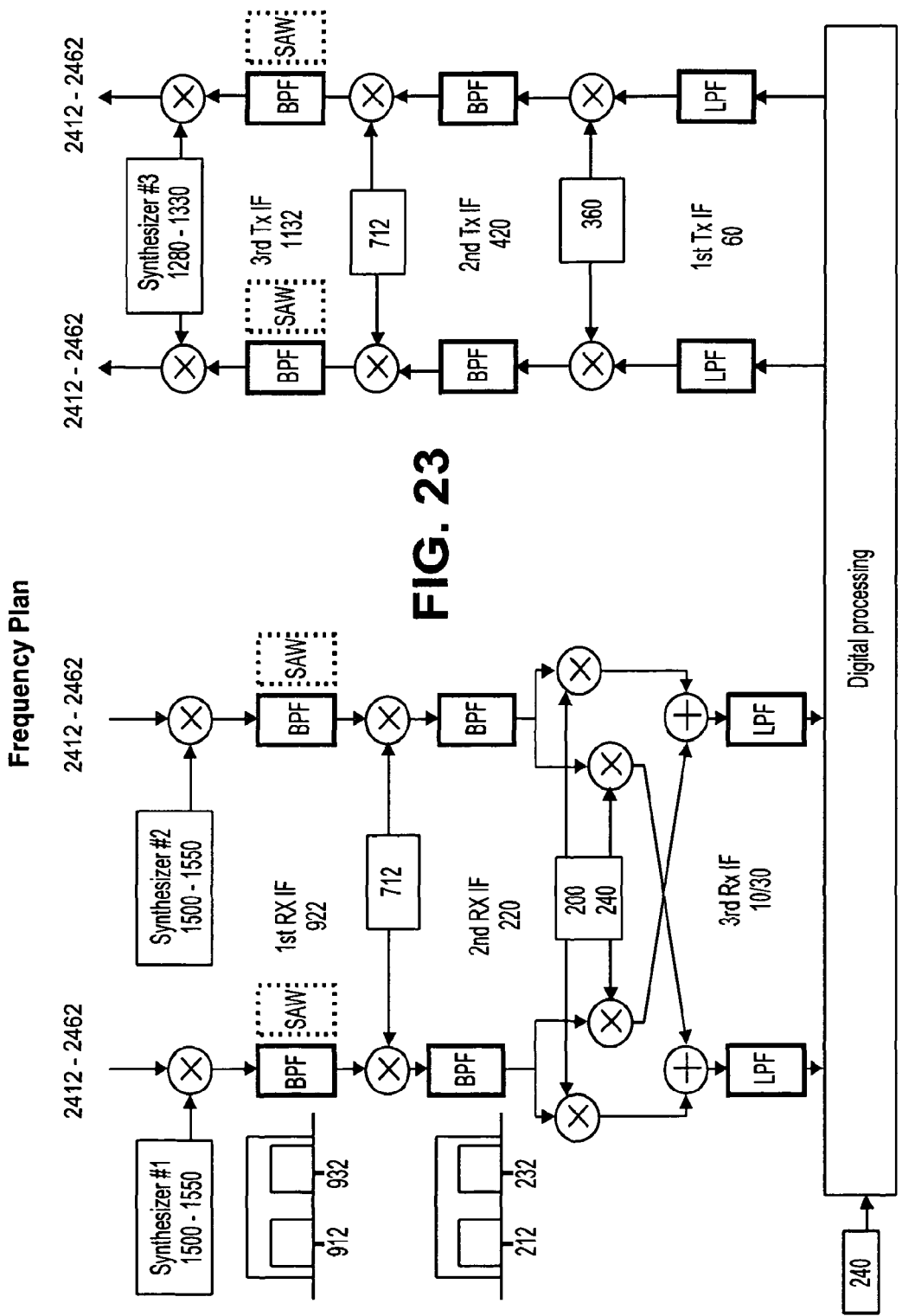
FIG. 23 is an illustration of an exemplary frequency plan during reception signal processing.

An exemplary frequency plan for the sample repeating is shown in FIG. 23. For first order products and signals on wires the frequency plan is free of self interference.

Figure 24:
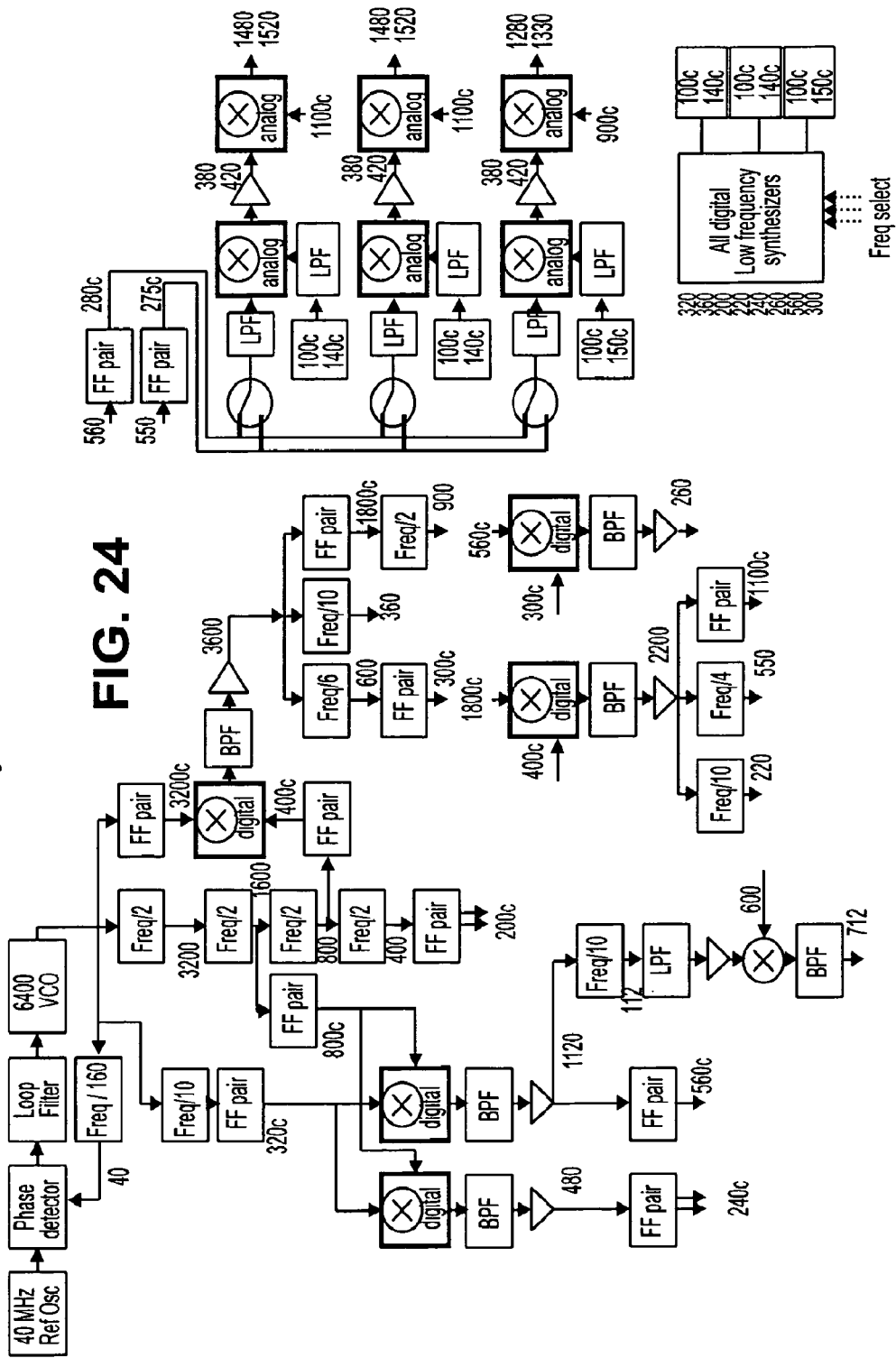
FIG. 24 is a block diagram of a related art low oscillation synthesizer.
Figure 25:
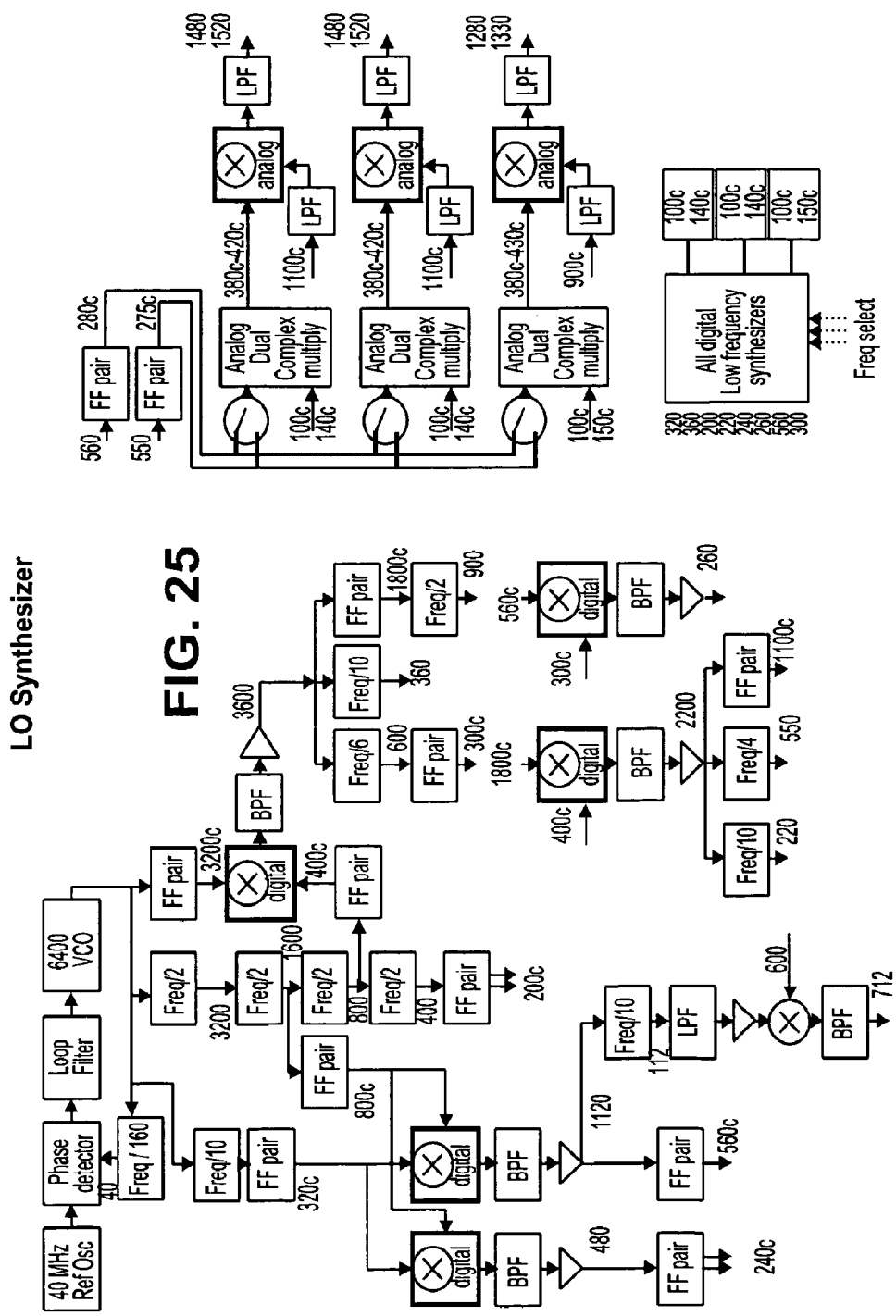
FIG. 25 is a block diagram of a low oscillation (LO) synthesizer for the exemplary repeater.
Figure 26:
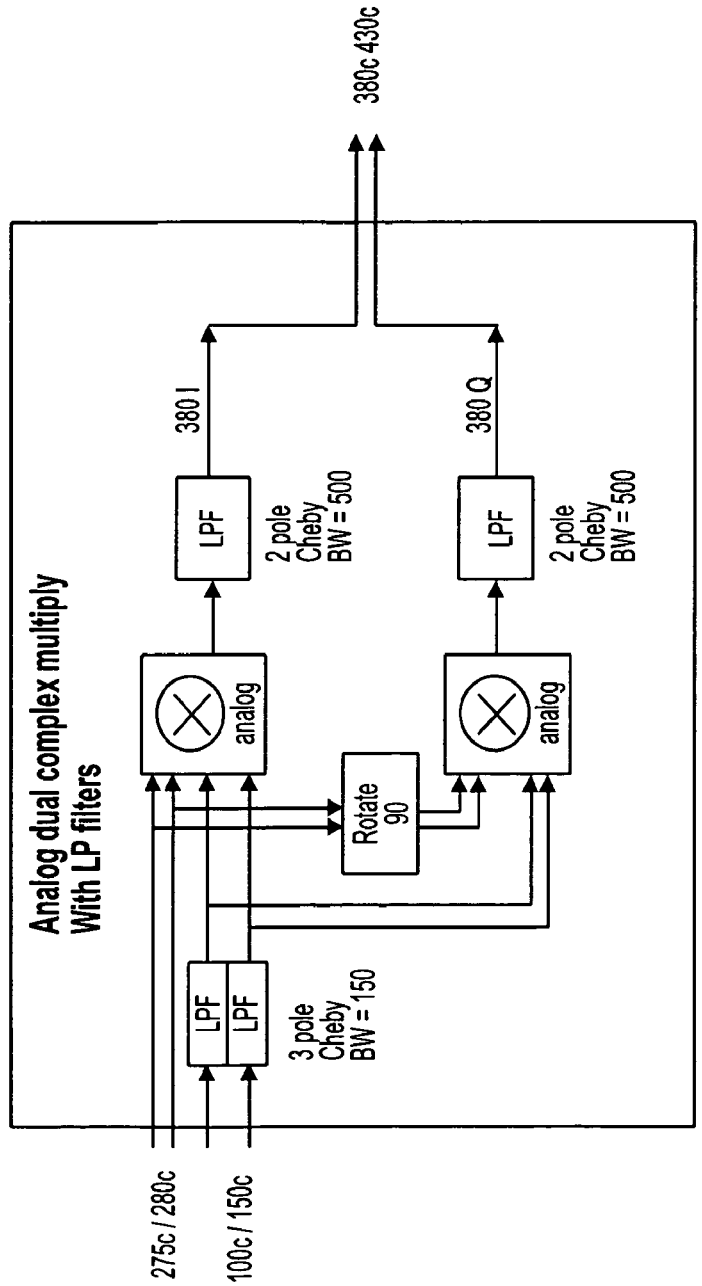
FIG. 26 is a block diagram of an analog dual complex multiplier for the LO synthesizer shown in FIG. 25.

Referring to FIG. 25, an exemplary low oscillation synthesizer for the exemplary repeater will be discussed. In comparison to a related art synthesizer shown in FIG. 24, the synthesizer according to the present embodiment includes analog dual complex multipliers shown in more detail in FIG. 26.

The synthesizer utilizes a single fixed Frequency Synthesizer to produce a variable LO by the product of two or more signals which are derived by dividing the fixed synthesizer using dividers. The dividers are integer based and perform multiplications between multiple divided signals to produce additional frequencies. The dividers may be tunable or programmable such that the resulting product's frequency is tunable.

The synthesizer can derive multiple LOs at different frequencies. A band pass filter followed by a limiter can be utilized to suppress non-desired multiplication (mixing) products. The LO is derived by multiple combinations of divided frequencies to allow for manipulation of residual spurious signals in the final LO.

Figure 27:
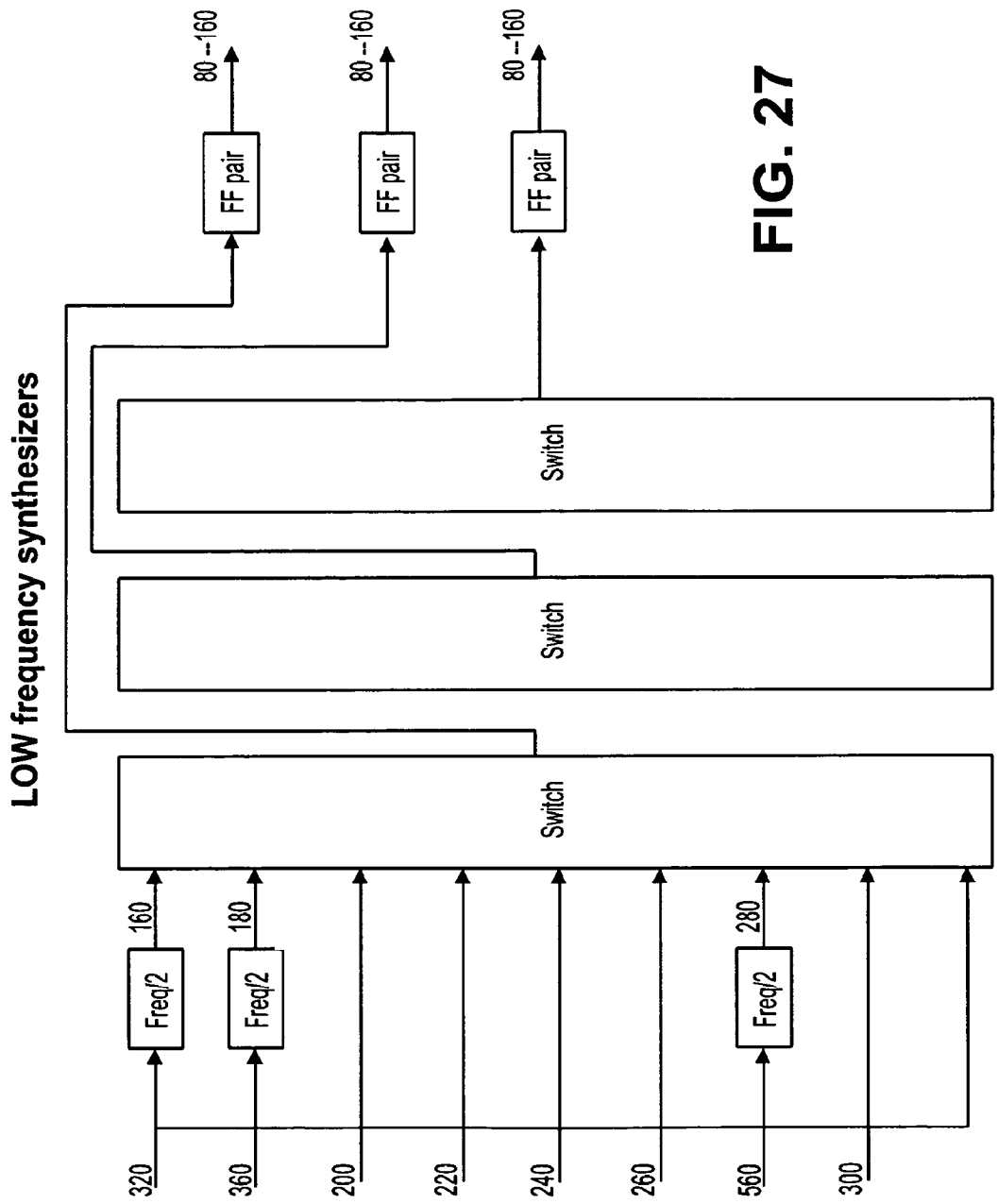
FIG. 27 is a block diagram of a low frequency synthesizer.
Figure 28:
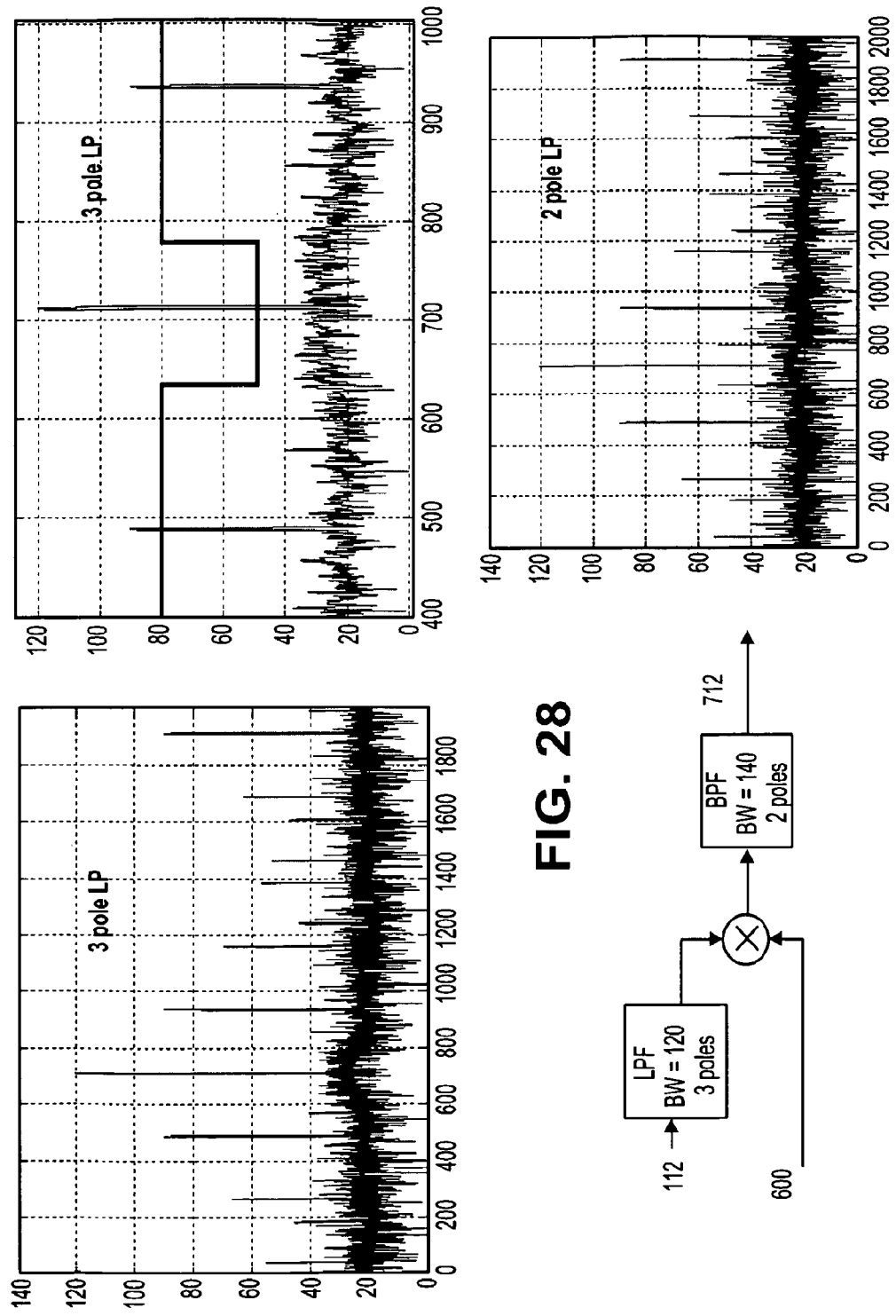
Figure 29:
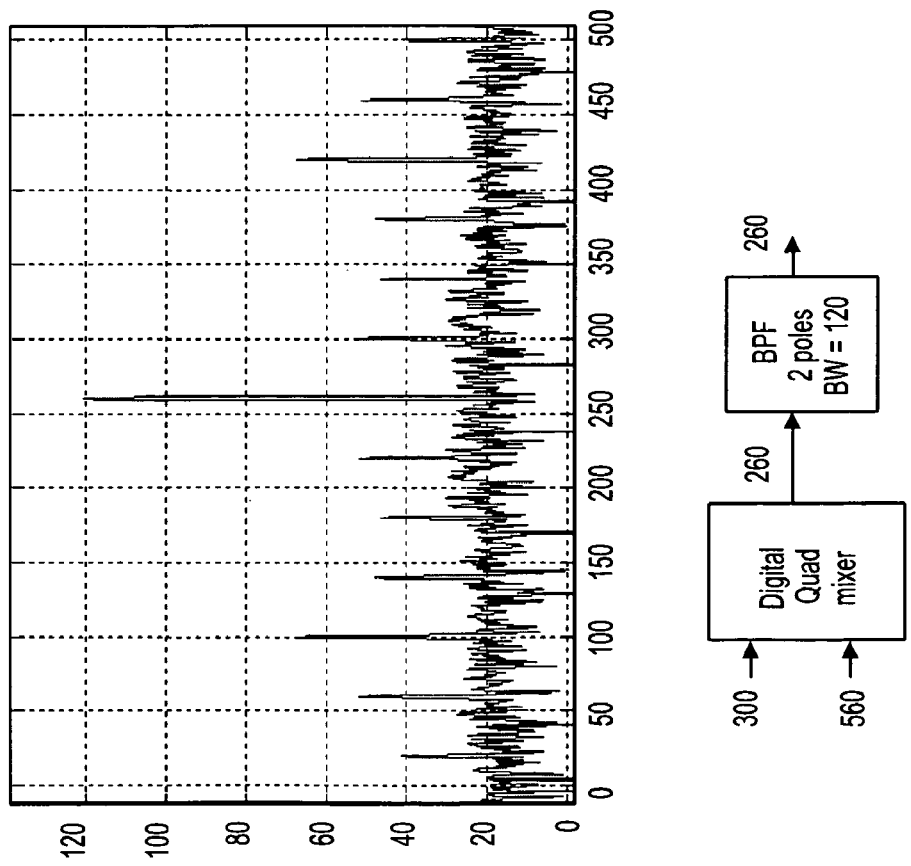
Figure 34:
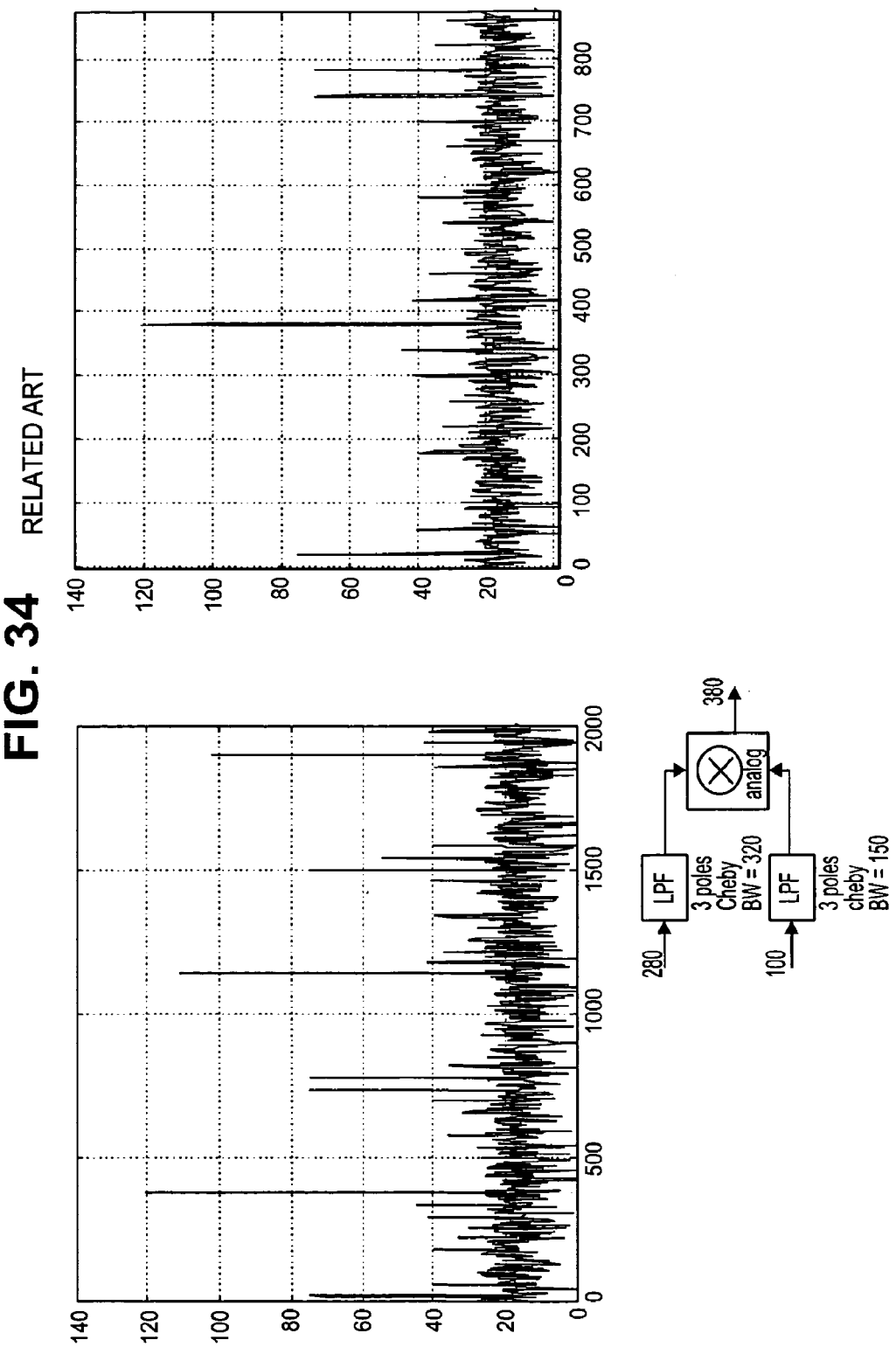
FIG. 34 is an illustration of the frequency spread for a related art frequency synthesizer.
Figure 36:
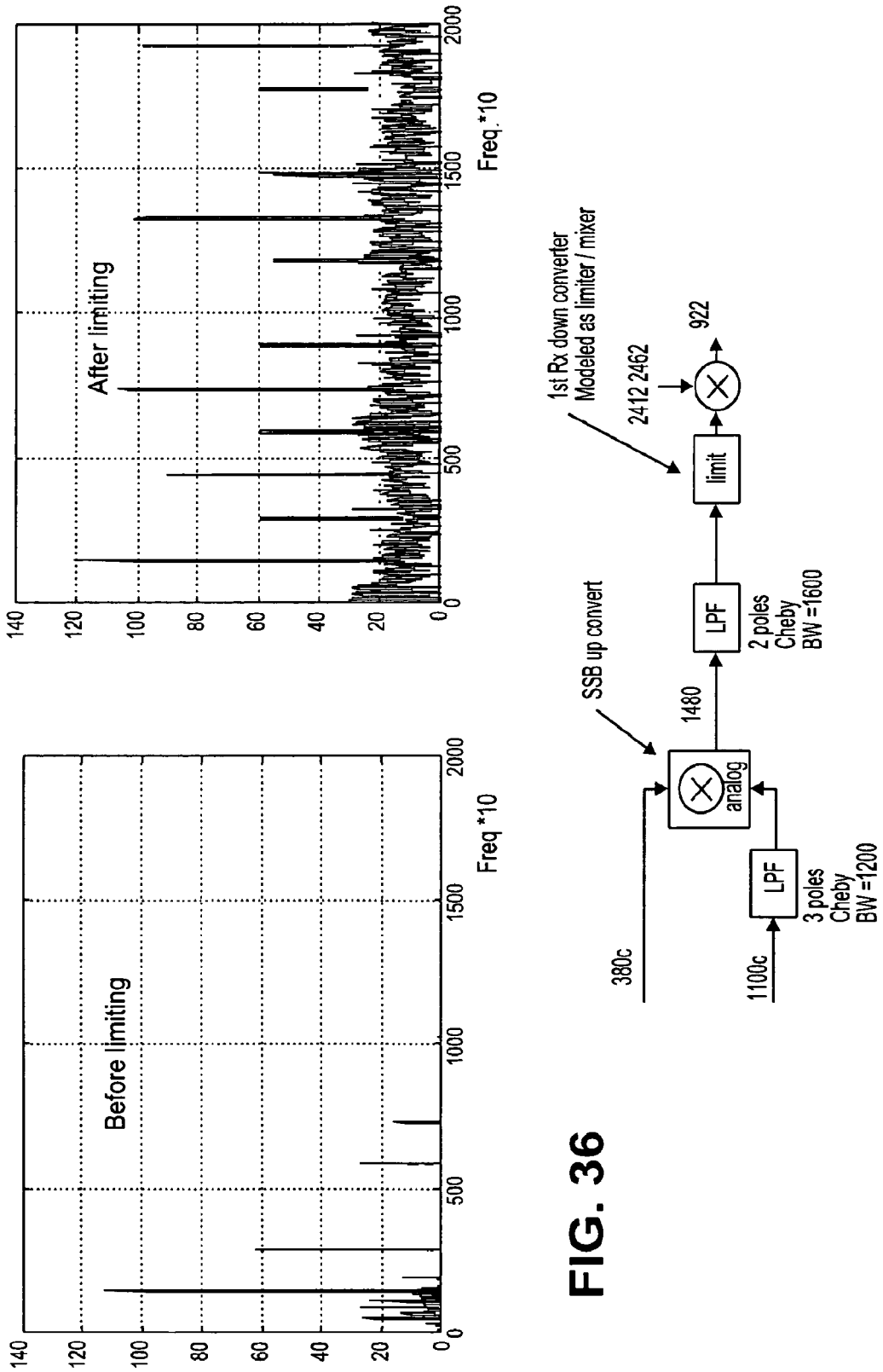
FIG. 36 is an illustration of mixer output of the frequency synthesizer before and after limiting.

Referring to FIG. 27, an exemplary configuration for the low frequency synthesizers is shown. The frequency spreads of the low frequency synthesizer for various pole configurations are shown in FIGS. 28-33 and 35. A frequency spread for a related art low frequency synthesizer is shown for comparison in FIG. 34. FIG. 36 shows a frequency spread of the synthesizer before and after limiting.

Figure 37:
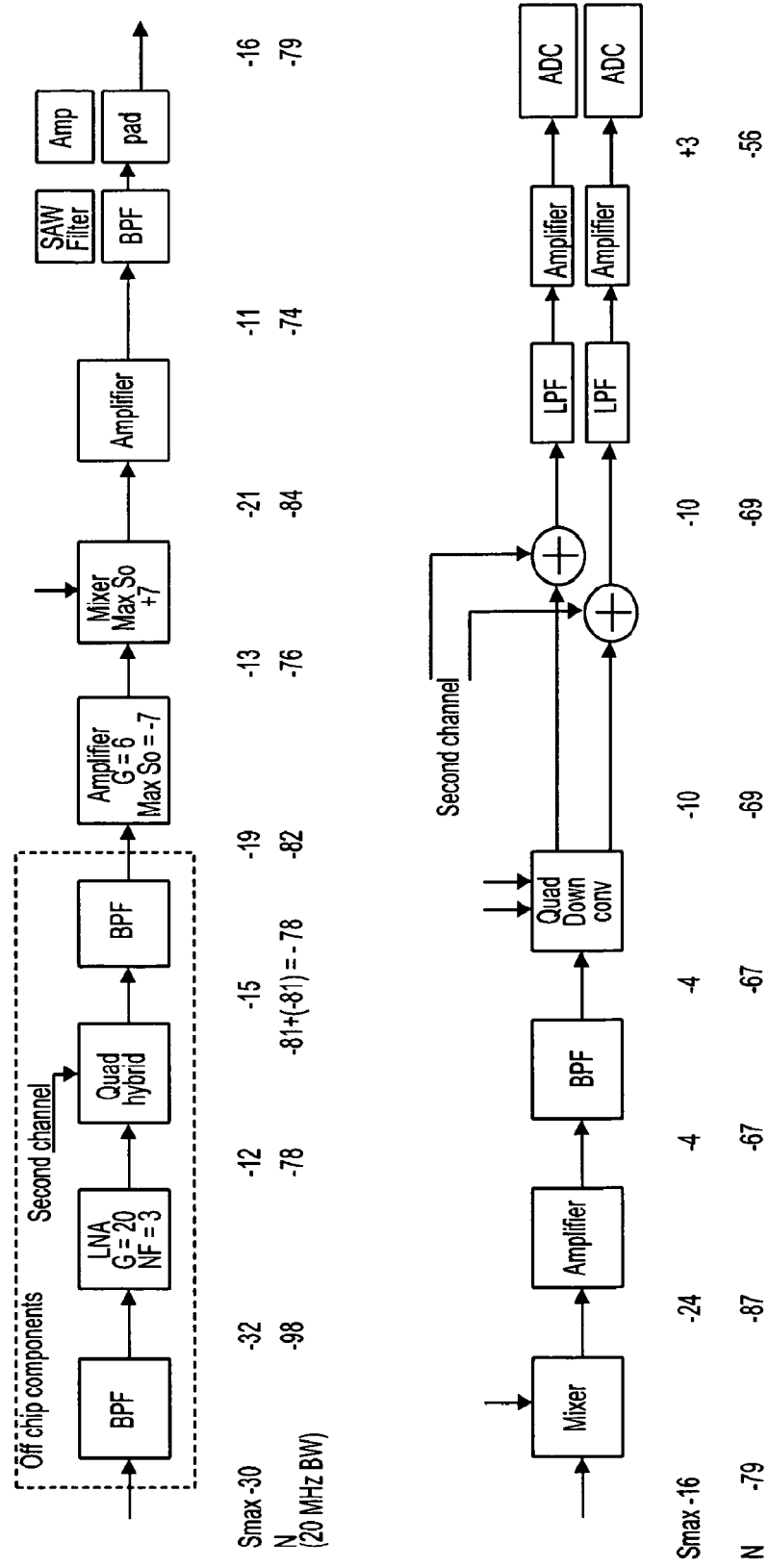
FIG. 37 is an illustration of signal level and noise for the receiver of the exemplary repeater.
Figure 38:
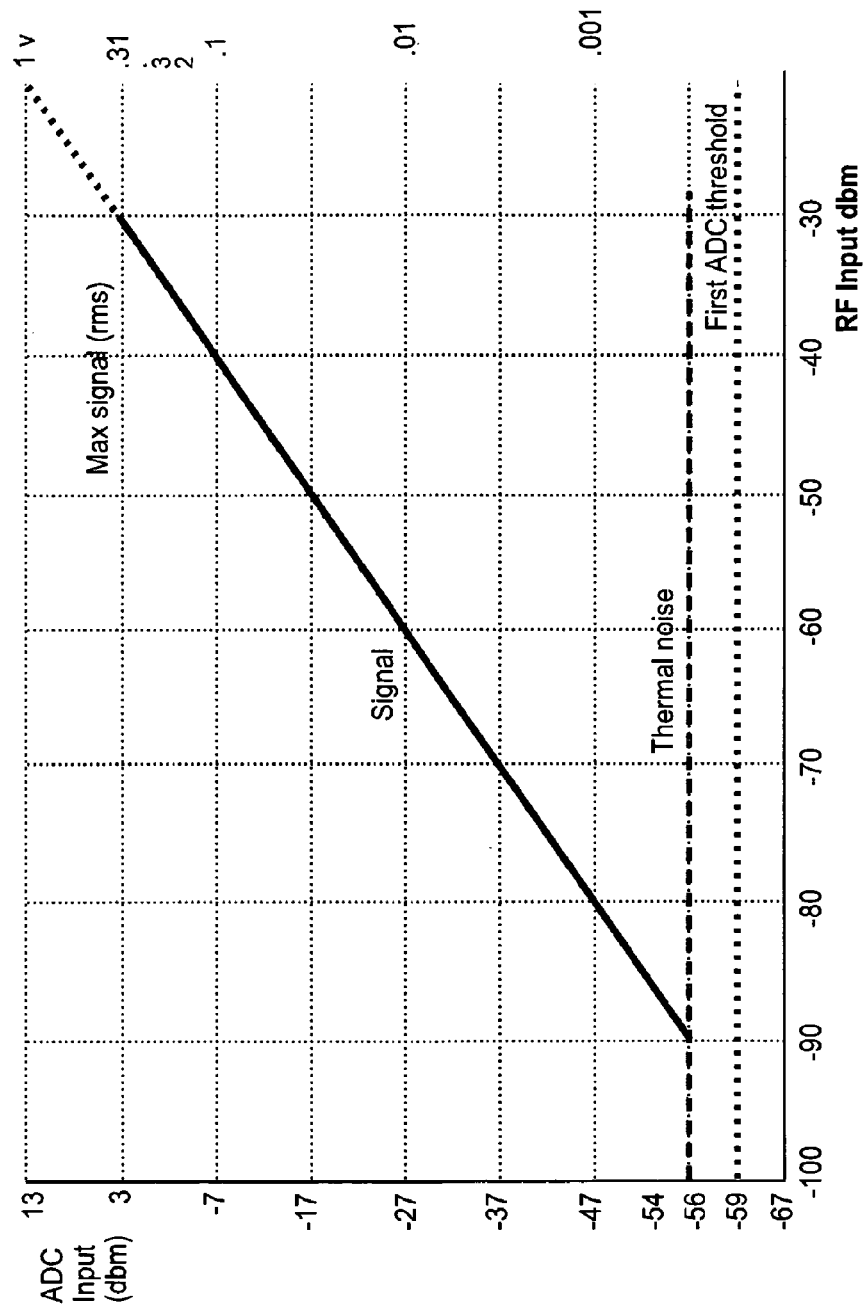
FIG. 38 is an illustration of the adjustable gain control (AGC) characteristics.

Referring to FIG. 37, signal level, noise and transmission leakage is shown for the receiver and the transmitter. The AGC characteristics are shown in FIG. 38. The noise pedestal is shown in FIG. 39.

In accordance with some embodiments, multiple antenna modules can be constructed within the same repeater or device, such as multiple directional antennas or antenna pairs as described above and multiple omni or quasi-omni-directional antennas for use, for example, in a MIMO environment or system. These same antenna techniques may be used for multi-frequency repeaters such as FDD based systems where a downlink is on one frequency and an uplink is present on another frequency.

Accordingly, the present disclosure concerns a repeater for a wireless communication network. The repeater, as shown for example in FIG. 8, includes first and second receivers coupled to first and second reception antennas for receiving a plurality of multiple in multiple out (MIMO) signal streams on different paths, and first and second transmitters coupled to first and second transmission antennas. The repeater further includes: a signal combiner for combining the plurality of MIMO signal streams according to various mathematical combinations to generate a plurality of combined MIMO signal streams; a weighting circuit for applying a weight to each of the plurality of MIMO signal streams to generate a plurality of weighted MIMO signal streams; and a digital processor for determining a predominate signal stream of the weighted MIMO signal streams. The predominate signal stream can be transmitted on the first transmission antenna and the remaining MIMO weighted signal streams can be transmitted on the second transmission antenna.

The digital processor can determine the predominate signal stream based upon at least one of signal strength, signal to noise ratio, and delay spread.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention. The various circuits described above can be implemented in discrete circuits or integrated circuits, as desired by implementation. Further, portions of the invention may be implemented in software or the like as will be appreciated by one of skill in the art and can be embodied as methods associated with the content described herein.

What is claimed is:

1. A repeater for a wireless communication network comprising:
   a first reception antenna for receiving a reception signal on a first path from one of an access point, another repeater or a wireless station device;
   a second reception antenna for receiving the reception signal on a second path from the one of the access point, the another repeater or the wireless station device;
   a reception weighting circuit for applying first and second weights to the reception signal received on the first and second paths to generate a first weighted reception signal and a second weighted reception signal;
   a signal combiner for combining the first and second weighted reception signals according to various mathematical combinations to generate a plurality of combined reception signals; and
   a transmission antenna for transmitting a transmission signal corresponding to one of the combined reception signals to one of the access point, the another repeater or the wireless station device.

2. The repeater of claim 1, wherein the first reception antenna is initially set to receive the reception signal on the first path via a first frequency channel and the second reception antenna is initially set to receive the reception signal on the second path via a second frequency channel.

3. The repeater of claim 2, further comprising:
   a signal detection device coupled to the first reception antenna and the second reception antenna, the signal detection device configured to detect a presence of the reception signal on one of the first reception antenna and the second reception antenna; and
   a control circuit coupled to the signal detection device and the first and second reception antennas, the control circuit configured to switch the first reception antenna to receive the reception signal on the second frequency channel or to switch the second reception antenna to receive the reception signal on the first frequency channel in accordance with the detection of the signal detection device.

4. The repeater of claim 3, further comprising:
   a digital filter for filtering the one of the combined reception signals, wherein the signal combiner is configured to store a first sample of the reception signal received at the first reception antenna and a second sample of the reception signal received at the second reception antenna and to load one of the first sample or the second sample into the digital filter in accordance with the one of the first reception antenna and the second reception antenna on which the signal detection detected the presence of the reception signal, wherein the digital filter filters the one of the combined reception signals in accordance with the one of the first sample or the second sample.

5. The repeater of claim 1, wherein the first and second reception antennas are first and second patch antennas and the transmission antenna is a dipole antenna.

6. The repeater of claim 1, wherein the first and second reception antennas are first and second dipole antennas and the transmission antenna is a patch antenna.

7. The repeater of claim 1, further comprising a transmission weight controller for applying a weight to the one of the combined reception signals based upon predetermined signal metrics to generate the transmission signal.

8. The repeater of claim 1, wherein the reception weighting circuit includes one of a variable phase shifter for adjusting a phase of the one of the first and second reception signals and a variable attenuator for adjusting a gain of the one of the first and second reception signals.

9. The repeater of claim 1, wherein the first and second paths have different angles of arrivals.

10. The repeater of claim 1, wherein the first reception antenna is configured to monitor a first frequency and the second reception antenna is configured to monitor a second frequency until the reception signal is detected by the first reception antenna on the first path over the first frequency, after which the second reception antenna retunes from the second frequency to the first frequency in response to the detection so as to receive the reception signal on the second path over the first frequency.

11. The repeater of claim 1, wherein the transmission signal corresponds to a given combined reception signal from the plurality of combined reception signals that is determined to most accurately reconstruct the reception signal.

12. The repeater of claim 11, wherein the reconstruction accuracy of each of the plurality of combined reception signals is gauged based on signal strength, signal-to-noise ratio (SNR) and/or delay spread.

13. A repeater for a wireless communication network, the repeater including first and second reception antennas for receiving a first reception signal on first and second paths, and first and second transmission antennas, the repeater comprising:
  a reception weighting circuit for applying first and second weights to the reception signal received on first and second reception paths to generate a first weighted reception signal and a second weighted reception signal;
  a signal combiner for combining the first and second weighted reception signals according to various mathematical combinations to generate a plurality of combined reception signals and outputting a predetermined one of the plurality of combined reception signals;
  a splitter for splitting the predetermined one of the plurality of combined reception signals into first and second transmission signals; and a transmission weighting circuit for applying a transmission weight to the first and second transmission signals to generate first and second weighted transmission signals,
  wherein the first and second transmission antennas transmit the first and second weighted transmission signals.

14. The repeater of claim 13, wherein the first and second paths have different angles of arrivals.

15. The repeater of claim 13, further comprising a controller for controlling the reception weighting circuit in accordance with a measured value of a self-generated signal transmitted over the first and second transmission antennas.

16. The repeater of claim 13, wherein the predetermined one of the plurality of combined reception signals corresponds to a given combined reception signal from the plurality of combined reception signals that is determined to most accurately reconstruct the reception signal.

17. The repeater of claim 16, wherein the reconstruction accuracy of each of the plurality of combined reception signals is gauged based on signal strength, signal-to-noise ratio (SNR) and/or delay spread.

18. A repeater for a wireless communication network, the repeater including first and second receivers coupled to first and second reception antennas for receiving a plurality of multiple in multiple out (MIMO) signal streams on different paths, and first and second transmitters coupled to first and second transmission antennas, the repeater comprising:
  a signal combiner for combining the plurality of MIMO signal streams according to various mathematical combinations to generate a plurality of combined MIMO signal streams;
  a weighting circuit for applying a weight to each of the plurality of MIMO signal streams to generate a plurality of weighted MIMO signal streams; and
  a digital processor for determining a predominate signal stream of the weighted MIMO signal streams, wherein the predominate signal stream is transmitted on the first transmission antenna and the remaining MIMO weighted signal streams are transmitted on the second transmission antenna.

19. The repeater according to claim 18, wherein the digital processor determines the predominate signal stream based upon at least one of signal strength, signal to noise ratio, and delay spread.

20. The repeater of claim 18, wherein the predominate signal stream is selected as a given weighted MIMO stream with a highest quality metric from among the plurality of weighted MIMO signal streams.

21. The repeater of claim 20, wherein a quality metric for each of the plurality of weighted MIMO streams is gauged based on signal strength, signal-to-noise ratio (SNR) and/or delay spread.

22. A method of operating a repeater within a wireless communication network, comprising:
  receiving a reception signal on a first path from one of an access point, another repeater or a wireless station device;
  receiving the reception signal on a second path from the one of the access point, the another repeater or the wireless station device;
  applying first and second weights to the reception signal received on the first and second paths to generate a first weighted reception signal and a second weighted reception signal;
  combining the first and second weighted reception signals according to various mathematical combinations to generate a plurality of combined reception signals; and
  transmitting a transmission signal corresponding to one of the combined reception signals to one of the access point, the another repeater or the wireless station device.

23. A method of operating a repeater within a wireless communication network, comprising:
  applying first and second weights to a reception signal received on first and second reception paths to generate a first weighted reception signal and a second weighted reception signal;
  combining the first and second weighted reception signals according to various mathematical combinations to generate a plurality of combined reception signals and outputting a predetermined one of the plurality of combined reception signals;
  splitting the predetermined one of the plurality of combined reception signals into first and second transmission signals;
  applying a transmission weight to the first and second transmission signals to generate first and second weighted transmission signals; and
  transmitting the first and second weighted transmission signals.

24. A method of operating a repeater within a wireless communication network, comprising:
  combining a plurality of multiple in multiple out (MIMO) signal streams according to various mathematical combinations to generate a plurality of combined MIMO signal streams;
  applying a weight to each of the plurality of MIMO signal streams to generate a plurality of weighted MIMO signal streams; and
  determining a predominate signal stream of the weighted MIMO signal streams;
  transmitting the predominate signal stream with a first transmission antenna; and
  transmitting the remaining MIMO weighted signal streams on a second transmission antenna.

25. A repeater within a wireless communication network, comprising:
  means for receiving a reception signal on a first path from one of an access point, another repeater or a wireless station device;
  means for receiving the reception signal on a second path from the one of the access point, the another repeater or the wireless station device;

means for applying first and second weights to the reception signal received on the first and second paths to generate a first weighted reception signal and a second weighted reception signal;

means for combining the first and second weighted reception signals according to various mathematical combinations to generate a plurality of combined reception signals; and means for transmitting a transmission signal corresponding to one of the combined reception signals to one of the access point, the another repeater or the wireless station device.

26. A repeater within a wireless communication network, comprising:

means for applying first and second weights to a reception signal received on first and second reception paths to generate a first weighted reception signal and a second weighted reception signal;

means for combining the first and second weighted reception signals according to various mathematical combinations to generate a plurality of combined reception signals and outputting a predetermined one of the plurality of combined reception signals;

means for splitting the predetermined one of the plurality of combined reception signals into first and second transmission signals;

means for applying a transmission weight to the first and second transmission signals to generate first and second weighted transmission signals; and means for transmitting the first and second weighted transmission signals.

27. A repeater within a wireless communication network, comprising:

means for combining a plurality of multiple in multiple out (MIMO) signal streams according to various mathematical combinations to generate a plurality of combined MIMO signal streams;

means for applying a weight to each of the plurality of MIMO signal streams to generate a plurality of weighted MIMO signal streams; and means for determining a predominate signal stream of the weighted MIMO signal streams;

means for transmitting the predominate signal stream with a first transmission antenna; and means for transmitting the remaining MIMO weighted signal streams on a second transmission antenna.

28. A non-transitory computer-readable medium containing instructions stored thereon, which, when executed by a repeater within a wireless communication network, cause the repeater to perform operations, comprising:

at least one instruction for receiving a reception signal on a first path from one of an access point, another repeater or a wireless station device;

at least one instruction for receiving the reception signal on a second path from the one of the access point, the another repeater or the wireless station device;

at least one instruction for applying first and second weights to the reception signal received on the first and second paths to generate a first weighted reception signal and a second weighted reception signal;

at least one instruction for combining the first and second weighted reception signals according to various mathematical combinations to generate a plurality of combined reception signals; and at least one instruction for transmitting a transmission signal corresponding to one of the combined reception signals to one of the access point, the another repeater or the wireless station device.

29. A non-transitory computer-readable medium containing instructions stored thereon, which, when executed by a repeater within a wireless communication network, cause the repeater to perform operations, comprising:

at least one instruction for applying first and second weights to a reception signal received on first and second reception paths to generate a first weighted reception signal and a second weighted reception signal;

at least one instruction for combining the first and second weighted reception signals according to various mathematical combinations to generate a plurality of combined reception signals and outputting a predetermined one of the plurality of combined reception signals;

at least one instruction for splitting the predetermined one of the plurality of combined reception signals into first and second transmission signals;

at least one instruction for applying a transmission weight to the first and second transmission signals to generate first and second weighted transmission signals; and at least one instruction for transmitting the first and second weighted transmission signals.

30. A non-transitory computer-readable medium containing instructions stored thereon, which, when executed by a repeater within a wireless communication network, cause the repeater to perform operations, comprising:

at least one instruction for combining a plurality of multiple in multiple out (MIMO) signal streams according to various mathematical combinations to generate a plurality of combined MIMO signal streams;

at least one instruction for applying a weight to each of the plurality of MIMO signal streams to generate a plurality of weighted MIMO signal streams; and at least one instruction for determining a predominate signal stream of the weighted MIMO signal streams;

at least one instruction for transmitting the predominate signal stream with a first transmission antenna; and at least one instruction for transmitting the remaining MIMO weighted signal streams on a second transmission antenna.

* * * * *